(12) United States Patent
Kenney et al.

(10) Patent No.: US 11,785,432 B2
(45) Date of Patent: *Oct. 10, 2023

(54) APPARATUS, SYSTEM AND METHOD OF COMMUNICATING A PHYSICAL LAYER (PHY) PROTOCOL DATA UNIT (PPDU) WITH VERSION IDENTIFIER

(71) Applicant: INTEL CORPORATION, Santa Clara, CA (US)

(72) Inventors: Thomas J. Kenney, Portland, OR (US); Xiaogang Chen, Portland, OR (US); Qinghua Li, San Ramon, CA (US); Feng Jiang, Santa Clara, CA (US); Laurent Cariou, Portland, OR (US); Bahareh Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,553

(22) Filed: Mar. 1, 2022

(65) Prior Publication Data

US 2022/0182803 A1 Jun. 9, 2022

Related U.S. Application Data

(63) Continuation of application No. 16/928,330, filed on Jul. 14, 2020.

(Continued)

(51) Int. Cl.
*H04W 4/40* (2018.01)
*H04L 1/00* (2006.01)
(Continued)

(52) U.S. Cl.
CPC .............. *H04W 4/40* (2018.02); *H04L 1/004* (2013.01); *H04L 69/323* (2013.01); *H04W 28/065* (2013.01)

(58) Field of Classification Search
CPC ....... H04W 4/40; H04W 28/065; H04W 4/02; H04W 4/027; H04W 4/06; H04W 4/44;
(Continued)

(56) References Cited

U.S. PATENT DOCUMENTS

2011/0044271 A1* 2/2011 Hong .................... H04W 28/06
370/329
2018/0014327 A1* 1/2018 Park .................... H04W 74/006
(Continued)

OTHER PUBLICATIONS

Office Action for U.S. Appl. No. 16/928,330, dated Oct. 27, 2022, 26 pages.
(Continued)

*Primary Examiner* — Kiet Tang
(74) *Attorney, Agent, or Firm* — Shichrur & Co.

(57) ABSTRACT

For example, a Next Generation Vehicular (NGV) wireless communication station (STA) may be configured to generate an NGV Physical Layer (PHY) Protocol Data Unit (PPDU) including an NGV preamble, the NGV preamble comprising a non High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the L-SIG field, and an NGV Signal (NGV-SIG) field after the RL-SIG field, the NGV-SIG field including a version field configured to identify a version of the NGV PPDU; and to transmit the NGV PPDU over an NGV channel in an NGV wireless communication frequency band; and a memory to store information processed by the processor.

25 Claims, 12 Drawing Sheets

Related U.S. Application Data

(60) Provisional application No. 62/874,151, filed on Jul. 15, 2019.

(51) Int. Cl.
*H04L 69/323* (2022.01)
*H04W 28/06* (2009.01)

(58) Field of Classification Search
CPC ....... H04W 4/70; H04W 4/80; H04W 74/006; H04L 1/004; H04L 69/323; H04L 1/0045; H04L 1/0075; H04L 1/08; H04L 5/0044; H04L 1/0041
See application file for complete search history.

(56) References Cited

U.S. PATENT DOCUMENTS

| | | | | |
|---|---|---|---|---|
| 2019/0342796 | A1* | 11/2019 | Lepp | .............. H04L 1/0041 |
| 2020/0344582 | A1 | 10/2020 | Kenney et al. | |
| 2022/0150676 | A1 | 5/2022 | Lim et al. | |

OTHER PUBLICATIONS

IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

IEEE Std 802.11p-2010. IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 6: Wireless Access in Vehicular Environments, Jul. 15, 2010, 51 pages.

IEEE P802.11ax/D4.0 Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Feb. 2019, 746 pages.

Notice of Allowance for U.S. Appl. No. 16/928,330, dated Feb. 21, 2023, 7 pages.

\* cited by examiner

US 11,785,432 B2

APPARATUS, SYSTEM AND METHOD OF COMMUNICATING A PHYSICAL LAYER (PHY) PROTOCOL DATA UNIT (PPDU) WITH VERSION IDENTIFIER

CROSS REFERENCE

This application claims the benefit of, and priority from, U.S. Provisional Patent Application No. 62/874,151 entitled "Enhanced Preamble", filed Jul. 15, 2019, the entire disclosure of which is incorporated herein by reference.

TECHNICAL FIELD

Embodiments described herein generally relate communicating a Next Generation Vehicular (NGV) Physical Layer (PHY) Protocol Data Unit (PPDU).

BACKGROUND

A vehicular communication protocol may be implemented in a vehicular system to provide services and communications between vehicles and/or other vehicular devices and/or elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
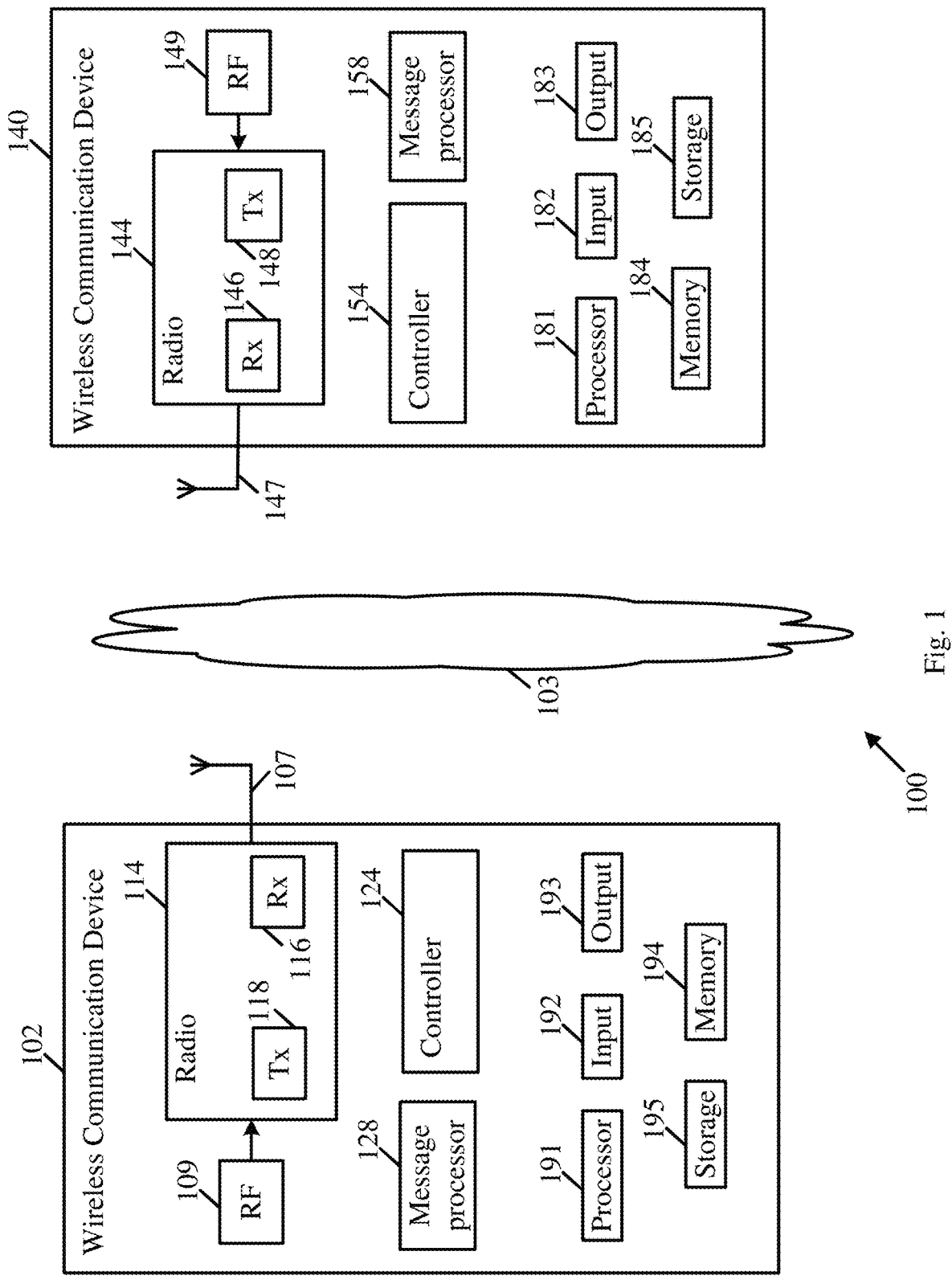
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and and/or systems, for example, a vehicular device, a vehicular system, a user device, a User Equipment (UE), a Mobile Device (MD), a wireless station (STA), a mobile computer, a laptop computer, a notebook computer, a tablet computer, a server computer, a handheld computer, a handheld device, a wearable device, a sensor device, an Internet of Things (IoT) device, an on-board device, an off-board device, a hybrid device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11bd (IEEE P802.11bd/D0.3, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 5: Enhancements for Next Generation Vehicular Communication, April 2020), IEEE 802.11p (IEEE P802.11p-2010, IEEE Draft Standard for Information Technology-Telecommunications and information exchange between systems—Local and metropolitan area networks—Specific requirements, Part 11: Wireless LAN Medium Access Control (MAC) and Physical Layer (PHY) specifications, Amendment 6: Wireless Access in Vehicular Environments, July 2010), IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016), and/or IEEE 802.11ax (IEEE P802.11axD6.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, November 2019)) and/or future versions and/or derivatives thereof, devices and/or networks operating in accordance with existing cellular specifications and/or protocols, e.g., 3rd Generation Partnership Project (3GPP), 3GPP Long Term Evolution (LTE), Fifth Generation (5G) mobile networks, and/or future versions and/or derivatives thereof, units and/or devices which are part of the above networks, and the like.

Some embodiments may be used in conjunction with one way and/or two-way radio communication systems, vehicular communication systems, cellular radio-telephone communication systems, a mobile device, a mobile phone, a cellular telephone, a wireless telephone, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that may be integrated with a computer, or a peripheral that may be attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a vehicular wireless communication network, for example, a vehicular WLAN, e.g., a Dedicated Short-Range Communication (DSRC) network. Other embodiments may be used in conjunction with any other suitable wireless communication network, for example, a WLAN, wireless area network, a "piconet", a WPAN, a WVAN and the like.

Some demonstrative embodiments may be used in conjunction with a wireless communication network communicating over a wireless communication frequency band of 5.9 Gigahertz (GHz), for example, a frequency band between 5.85 (GHz) and 5.925 GHz. However, other embodiments may be implemented utilizing any other suitable wireless communication frequency bands, for example, a 2.4 GHz band, a 5 GHz band, a 6 GHz frequency band, a frequency band above 45 GHz, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "vehicular wireless communication frequency band", as used herein, may relate to a frequency band for communication in a vehicular wireless communication network. In one example, the vehicular wireless communication frequency band may include a frequency band of 5.9 GHz and/or a DSRC band, for example, a band between 5.85 GHz and 5.925 GHz. In other embodiments, any other suitable wireless communication frequency band may be implemented.

In some demonstrative embodiments, vehicular network communications may involve one or more vehicular wireless network communications, for example, communications between one vehicular network elements and one or more other vehicular network elements.

In some demonstrative embodiments, for example, vehicular network communications may include Vehicle to everything (V2X) communication, which may be configured communication between a vehicle and one more entities, e.g., any entity, which may affect the vehicle, and vice versa. For example, the V2X communications may include Vehicle-to-Infrastructure (V2I) communications, Vehicle-to-network (V2N) communications, Vehicle-to-vehicle (V2V) communications, Vehicle-to-Pedestrian (V2P) communications, Vehicle-to-device (V2D) communications, Vehicle-to-grid (V2G) communications, and/or any other type of communication, which may involve at least one vehicular system element.

Some demonstrative embodiments may be implemented by a Next Generation Vehicular (NGV) STA, e.g., as described below.

For example, the NGV STA may include a STA configured to communicate according to one or more NGV communication protocols and/or standards, for example, an IEEE 802.11bd Specification.

In one example, the NGV STA may be configured to support communication over one or more NGV channels, for example, the NGV STA may be configured to support 10 Megahertz (MHz) and/or 20 MHz channel spacing, for example, according to an IEEE 802.11 Specification, e.g., as defined in Clause 17 (Orthogonal frequency division multiplexing (OFDM) PHY specification) of IEEE 802.11-2016 and/or any other corresponding section of any other future version.

In one example, the NGV STA may be configured to support one or more NGV features of an NGV Media Access Controller (MAC), and/or one or more NGV features of an NGV Physical layer (PHY).

In one example, the NGV STA may include, for example, a STA having a radio transmitter, which is capable of operating on a channel that is within a vehicular wireless communication band, e.g., a DSRC band and/or any other band.

In some demonstrative embodiments, the NGV STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a vehicular device or a non-vehicular, e.g., a static, device.

In some demonstrative embodiments, device 102 may include, or may be implemented as part of, a vehicle.

In other embodiments, device 102 and/or device 140 may include, or may be implemented as part of, any other element of a vehicular system and/or a system to communicate and/or interact with a vehicular system. For example, device 102 and/or device 140 may include, or may be implemented as part of, an infrastructure device, e.g., a traffic light, a traffic sign, and the like; a network element; a user device, e.g., a pedestrian device, and/or the like.

In other embodiments, device 102 and/or device 140 may include, or may be implemented as part of, any other element of any other system.

In one example, device 102 may include, or may be implemented by, a first vehicle, and device 104 may include, or may be implemented by, a second vehicle. According to this example, devices 102 and 140 may communicate V2V communications.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, devices 102 and/or 140 may be capable of communicating content, data, information and/or signals via a wireless medium (WM) 103. In some demonstrative embodiments, wireless medium 103 may include, for example, a radio channel, a cellular channel, an RF channel, a vehicular communication channel, an NGV channel, a DSRC channel, a WiFi channel, a 5G channel, an IR channel, a Bluetooth (BT) channel, a Global Navigation Satellite System (GNSS) Channel, and the like.

In some demonstrative embodiments, WM 103 may include one or more NGV channels in an NGV wireless communication frequency band, e.g., as described below. In other embodiments WM 103 may include any other channels.

In some demonstrative embodiments, the NGV wireless communication frequency band may include a 5.9 GHz wireless communication frequency band, e.g., as described below.

In some demonstrative embodiments, the NGV wireless communication frequency band may include a band between 5.85 GHz and 5.925 GHz, e.g., as described below.

In some demonstrative embodiments, the NGV wireless communication frequency band may include a DSRC band, e.g., as described below.

In other embodiments, the NGV wireless communication frequency band may include any other wireless frequency band.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a vehicular wireless communication band, for example, an NGV band, a DSRC band, a 5.9 GHz band, and/or any other band, for example, a 2.4 GHz band, a 5 GHz band, a S1G band, and/or any other band.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more vehicular communication STAs, for example, NGV STAs. For example, device 102 may include, operate as, perform the role of, and/or perform one or more functionalities of, at least one vehicular communication STA, e.g., an NGV STA, and/or device 140 may include, operate as, perform the role of, and/or perform one or more functionalities of, at least one vehicular communication STA, e.g., an NGV STA.

In other embodiments, devices 102 and/or 140 may include, operate as, perform the role of, and/or perform one or more functionalities of, any other wireless device and/or station, e.g., a WLAN STA, a WiFi STA, and the like.

In other embodiments, device 102 and/or device 140 may operate as, perform the role of, and/or perform one or more functionalities of, a non-AP STA and/or an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, an AP STA may include a station (STA) that is an AP. The AP STA may perform any other additional or alternative functionality.

In one example, a non-AP STA may include a STA that is not contained within an AP. The non-AP STA may perform any other additional or alternative functionality.

In other embodiments, device 102 and/or device 140 may operate as, perform the role of, and/or perform one or more functionalities of, any other additional or alternative device and/or station.

In some demonstrative embodiments devices 102 and/or 140 may be configured to communicate over a vehicular communication network, for example, a NGV network, and/or any other network. For example, devices 102 and/or 140 may perform wireless communication, for example, for communicating over a vehicular wireless communication frequency band, for example, an NGV band, a DSRC band, a 5.9 GHz band and/or any other band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11p-2010 Specification, an IEEE 802.11bd Specification, and/or any other specification and/or protocol.

Some demonstrative embodiments may be implemented, for example, as part of a new standard, for example, as an evolution of an IEEE 802.11p Specification.

In some demonstrative embodiments, devices 102 and/or 140 may be configured according to one or more standards, for example, in accordance with an IEEE 802.11bd Standard, which may be, for example, configured to enhance the efficiency and/or performance of an IEEE 802.11p-2010 Specification.

Some demonstrative embodiments may enable, for example, to significantly improve and/or increase one or more aspects, for example, throughput, data transmission rates, reliability, range, and/or robustness, defined in the IEEE 802.11p-2010 Specification.

Some demonstrative embodiments may be implemented, for example, to allow increasing a transmission data rate, for example, by applying MIMO and/or Modulation and Coding Scheme (MCS) techniques.

Some demonstrative embodiments may be implemented, for example, to allow increasing a transmission reliability, for example, by applying encoding techniques, e.g., Low Density Parity Check (LDPC) techniques.

Some demonstrative embodiments may be implemented, for example, to support increased transmission range and/or robustness, for example, by applying encoding and/or modulation techniques, e.g., Space Time Block Coding (STBC), Dual Carrier Modulation (DCM), midambles, traveling pilots, and the like.

In some demonstrative embodiments, device 102 and/or device 140 may include, operate as, perform a role of, and/or perform the functionality of, one or more NGV STAs. For example, device 102 may include, operate as, perform a role of, and/or perform the functionality of, at least one NGV STA, and/or device 140 may include, operate as, perform a role of, and/or perform the functionality of, at least one NGV STA.

In some demonstrative embodiments, devices 102 and/or 140 may implement a communication scheme, which may include Physical layer (PHY) and/or Media Access Control (MAC) layer schemes, for example, to support one or more applications, and/or enhanced wireless communication techniques.

In some demonstrative embodiments, the PHY and/or MAC layer schemes may be configured to support communication over an NGV channel and/or an NGV band, e.g., as described below.

In some demonstrative embodiments, devices 102 and/or 140 may be configured to communicate over a DSRC network, for example in accordance with a protocol, e.g., according to an IEEE802.11bd Standard, which may be configured as an evolution of an IEEE 802.11p Specification.

In some demonstrative embodiments, the PHY and/or MAC layer schemes may be configured to support communication over a 10MHZ channel, e.g., as described below.

In some demonstrative embodiments, the PHY and/or MAC layer schemes may be configured to support communication over a 20MHZ channel, e.g., as described below.

In some demonstrative embodiments, the PHY and/or MAC layer schemes may be configured to support communication over two 10 MHZ channels, e.g., as described below.

In some demonstrative embodiments, the PHY and/or MAC layer schemes may be configured to support communication over two duplicate 10 MHZ channels, e.g., as described below.

In other embodiments, embodiments, the PHY and/or MAC layer schemes may be configured to support any other wireless communication channels and/or frequency bands.

In some demonstrative embodiments, devices 102 and/or 140 may be configured to generate, process, transmit and/or receive a PHY Protocol Data Unit (PPDU) having a PPDU format (also referred to as "NGV PPDU format"), which may be configured, for example, for communication between NGV stations, e.g., as described below.

In some demonstrative embodiments, a PPDU, e.g., an NGV PPDU, may include at least one non-NGV field, for example, a non-High-Throughput (HT) field, e.g., a legacy field, which may be identified, decodable, and/or processed by one or more devices ("non-NGV devices", non-HT devices, or "legacy devices"), which may not support one or more features and/or mechanisms ("non-legacy" mechanisms or "NGV mechanisms"). For example, the legacy devices may include non-NGV stations, e.g., non-HT stations, which may be, for example, configured according to an IEEE 802.11-2016Standard, and the like. For example, a non-NGV station may include an 802.11 STA, which is not an NGV station.

In some demonstrative embodiments, devices 102 and/or 140 may be configured to generate, transmit, receive and/or process one or more transmissions, e.g., including one or more NGV PPDUs, e.g., as described below.

In some demonstrative embodiments, for example, devices 102 and/or 140 may be configured to perform one or more operations, and/or functionalities of an NGV STA, which may be configured, for example, to generate, transmit, receive and/or process one or more transmissions, e.g., including one or more NGV PPDUs, e.g., as described below.

In some demonstrative embodiments, devices 102 and/or 140 may be configured to generate, transmit, receive and/or process one or more transmissions of PPDUs, for example, non-NGV PPDUs and/or NGV PPDUs, e.g., in accordance with an IEEE 802.11bd Specification and/or any other specification.

In some demonstrative embodiments, devices 102 and/or 140 may be configured to communicate an NGV PPDU including an NGV preamble, which may include one or more non-NGV fields, which may be decodable, for example, at least in part, by non-NGV STAs, e.g., as described below.

For example, the one or more non-NGV fields of the NGV preamble may be decodable, for example, at least in part, by a non-HT STA, e.g., as described below.

In some demonstrative embodiments, the NGV preamble of the NGV PPDU may be configured, for example, to enable the non-NGV STAs to decode one or more of the fields of the NGV preamble of the NGV PPDU, e.g., as described below.

In some demonstrative embodiments, devices 102 and/or 140 may be configured to support Vehicle-to-everything (V2X) communications, for example, to support one or more smart and/or autonomous vehicle use cases, e.g., as described below.

In some demonstrative embodiments, the V2X communications may be configured for passing of information from a vehicle to an entity that may affect the vehicle, and vice versa, e.g., as described below.

In some demonstrative embodiments, the V2X communications may include one or more specific types of communication, for example, a V2I communication, a V2N communication, a V2V communication, a V2P communication, a V2D communication, a V2G communication, and/or any other type of communication, e.g., as described below.

In some demonstrative embodiments, devices 102 and/or 140 may be configured to communicate over a DSRC band, for example, a 5.9 GHz band, e.g., a band between 5.85-5.925 GHz, and/or any other band, which may be reserved for vehicular communications, e.g., for V2I, V2N, V2V, and/or V2P communications, e.g., as described below.

In some demonstrative embodiments, devices 102 and/or 140 may be configured to perform one or more communications in accordance with an IEEE802.11p standard, which may define an air interface and/or wireless access.

In some demonstrative embodiments, devices 102 and/or 140 may be configured to implement one or more functionalities of one or more Vehicular Environments (WAVE) protocols, which may be defined, e.g., on top of the IEEE802.11p standard and/or any other standard, for example, to enable different vehicular services, for example, to enhance V2X services, and/or to provide a solution, which may be competitive with cellular based V2X solutions.

Some demonstrative embodiments may be implemented, for example, as part of a new standard, e.g., a Next Generation V2X standard, which may be configured to improve an IEEE802.11p air interface, for example, to provide a higher throughput, e.g., using MIMO, higher MCSS, a better reliability, e.g., using LDPC and/or any other coding, a longer range and/or robustness to high mobility, e.g., using extended range modulations, Dual Carrier Modulation (DCM), Space Time Block Code (STBC), midambles, traveling pilots, and/or any other additional, or alternative enhancements, e.g., as described below.

In some demonstrative embodiments, devices 102 and/or 140 may be configured to implement an air interface, for example, in accordance with, an IEEE 802.11bd Standard and/or any other standard, which may be, for example, configured to enhance the efficiency and/or performance of the IEEE 802.11p Specification, e.g., as described below.

In some demonstrative embodiments, devices 102 and/or 140 may be configured, for example, according to an air interface, which may be configured to be compatible with 802.11p devices, e.g., as described below.

In some demonstrative embodiments, devices 102 and/or 140 may be configured to communicate a PPDU, e.g., an NGV PPDU, which may be configured to provide a technical solution enabling legacy devices, for example, IEEE802.11p devices, to detect a portion of the PPDU, and to be able to defer transmission, for example, for the duration of the PPDU, e.g., as described below.

In some demonstrative embodiments, devices 102 and/or 140 may be configured to communicate a PPDU, e.g., an NGV PPDU, which may be configured to provide a technical solution to maximize reuse of one or more other standards, e.g., other Wi-Fi standards ("reused standards"), which may be used in the DSRC band. In one example, devices 102 and/or 140 may be configured to communicate according to a protocol, which may reuse one or more aspects of an IEEE 802.11ac standard and/or an IEEE802.11ax standard.

In some demonstrative embodiments, there may be a need to solve a technical problem when implementing a packet structure, which may not be used exactly in accordance with the other Wi-Fi standards. For example, communication according to the reused standards may be down clocked, for example, to enable operation in a minimum bandwidth of 10 MHz. For example, one or more features may be added to system or devices in accordance with the reused standards, for example, to meet some or all requirements and/or objectives of 802.11bd standards. For example, features such as higher mobility, e.g., channel tracking, position estimation, range extension, and/or any other features may be implemented.

In some demonstrative embodiments, it may be advantageous to reuse one or more existing standards, for example, to minimize product design changes, which may be required for operation in the DSRC band, for example, in accordance with requirements of an IEEE802.11bd Standard.

In some demonstrative embodiments, devices 102 and/or 140 may be configured to communicate a PPDU, e.g., an NGV PPDU, which may include a preamble configured based on and/or in accordance with one or more reused standards, e.g., as described below.

In some demonstrative embodiments, there may be a need to address a technical problem of a preamble design of a packet, which may be based on previous evolutions of one or more standards, e.g., one or more standards preceding the IEEE802.11ac and/or the IEEE 802.11ax Standards.

For example, current IEEE standards have been built such that with each evolution of a system, a new set of changes was introduced to the preamble, for example, to distinguish the packet from previous systems.

For example, there may be a need to address a technical problem of preamble revisions, where each new evolution uses unique SIG field designs for each version, and creates metrics using unique modulation techniques and manipulating L-SIG field parameters, e.g., to differentiate each new revision.

For example, according to previous releases of the IEEE 8023.11 Standards, a receiver may have to create multiple statistics, for example, based on signal fields following an L-SIG field. For example, the L-SIG field had to be manipulated, e.g., in some preamble revisions. For example, these metrics may affect packet classification and/or may unnecessarily complicate the design of the receiver.

For example, according to previous releases of the IEEE 8023.11 Standards there was no clear path from one evolution to a next evolution. For example, each evolution created a set of new metrics and/or mechanisms to differentiate its self from the previous legacy systems. For example, each evolution created new metrics using, for example, rotations and overloading signal parameters. For example, each version created a new signal field, which was unique to the new version and could not be decoded and/or utilized by legacy systems.

For example, an IEEE 802.11n packet has been defined with rotation of both HT Signal A (SIGA) symbols (QBPSK). In a later evolution step, an IEEE 802.11ac packet was defined based on rotation of one of the VHT SIGA symbols to distinguish between legacy and IEEE 801.11n systems. In a later evolution step, several metrics were introduced to identify an IEEE 802.11ax packet, in addition to identifying the type of an IEEE 802.11ax packet. For example, the IEEE 802.11ac packets and/or IEEE 802.11ax packets have high throughput as a basis of a packet structure, which adds overhead, which should be avoided in some use cases. These evolution steps are not able to provide a simple method to signal the revision of the packet or to have a consistent preamble definition from one revision to the next.

In some demonstrative embodiments, there may be a need to solve a technical problem of signaling a revision of a packet, and/or defining a consistent preamble definition from one revision to a next revision, in a way, which may be easy and efficient.

In some demonstrative embodiments, devices 102 and/or 140 may be configured to communicate a PPDU, e.g., an NGV PPDU, including a preamble structure, which may support a solution even without having to deal with legacy system burdens.

In some demonstrative embodiments, devices 102 and/or 140 may be configured to communicate a PPDU, e.g., an NGV PPDU, including a preamble structure, which may support a technical solution anticipating future revisions, which may likely be developed.

In some demonstrative embodiments, devices 102 and/or 140 may be configured to communicate a PPDU, e.g., an NGV PPDU, including a unified preamble, which may configured to afford easy evolution, which, in turn, may minimize design time and/or improve packet type detection.

In some demonstrative embodiments, devices 102 and/or 140 may be configured to communicate an NGV PPDU including a preamble structure, which may support one or more modes of operation, e.g., including one or more mandatory modes of operation. In one example, the mandatory modes of operation may include broadcast messaging and/or any other mandatory mode, e.g., as described below.

In some demonstrative embodiments, the broadcast messaging may support a single stream, and may not be required to support transmit beamforming, which may allow a simple preamble structure for this mode of operations, e.g., as described below.

In some demonstrative embodiments, the NGV PPDU including the preamble structure may enable detection of the packet, for example, in a simple manner, for example, for both current and future generations, and/or may reduce an overhead, which may be required to process an IEEE 802.11ac preamble.

In some demonstrative embodiments, devices 102 and/or 140 may be configured to communicate an NGV PPDU, which may be configured to avoid the issues described above with respect to the previous revisions of the IEEE 802.11 Standards, and/or may provide a new compact and/or efficient preamble option, for example, to support mandatory broadcast messaging, e.g., as described below.

In some demonstrative embodiments, devices 102 and/or 140 may be configured to implement one or more features of an IEEE 802.11ac system, which may be, for example, down-clocked by 2, for example, with modifications to support NGV use cases, for example, by addition of an RL-SIG field, a midamble, and/or one or more additional or alternative techniques, e.g., as described below.

In some demonstrative embodiments, devices 102 and/or 140 may be configured to implement an NGV preamble structure, which may support a mandatory broadcast messaging packet transmission and/or one or more other types of NGV packets, e.g., as described below.

In some demonstrative embodiments, the broadcast messaging packet may be based on an IEEE802.11ac packet, for example, by using some or all, e.g., a small subset, of features. For example, the broadcast messaging packet may be configured for using a single stream, for example, without transmit beamforming.

In some demonstrative embodiments, the preamble design may include one or more new features, for example, which are not part of the IEEE802.11ac packet, e.g., based on IEEE802.11ah/ax packets. For example, the new features may enable an extended range and/or support midambles, e.g., to allow higher mobility. In one example, other packet types, e.g., where higher data rate and other services may be required, may be configured to use VHT-STF and/or VHT LTF fields.

In some demonstrative embodiments, devices 102 and/or 140 may be configured to communicate a PPDU utilizing an NGV preamble, which may support a solution for robust and/or simple detection and/or evolution, e.g., as described below.

In some demonstrative embodiments, devices 102 and/or 140 may be configured to communicate an PPDU utilizing an NGV preamble including a unified NGV-SIG field, for example, to enable, future evolutions to use a same preamble design, while removing a need to create other metrics, e.g., such as constellation rotation and/or modulo operation on the Length field, e.g., as described below.

In some demonstrative embodiments, devices 102 and/or 140 may be configured to communicate an PPDU utilizing an NGV preamble including at least one SIG symbol, which may be configured to include a revision number, e.g., as described below.

In some demonstrative embodiments, a first SIG symbol, or one or more first SIG symbols, e.g., if more than one SIG symbol is used, may be configured to include a revision number, e.g. as described below.

In some demonstrative embodiments, the first SIG symbol, or one or more first SIG symbols, e.g., if more than one SIG symbol is used, may be configured to include one or more additional fields, for example, potentially a SIG symbol count, e.g., as described below.

In some demonstrative embodiments, the SIG symbol, e.g., the first SIG symbol, may include one or more parameters, which may be required in some or all future revisions, e.g., an indication of an MCS, a Short Guard Interval (GI), Coding information, and the like, e.g., as described below.

In some demonstrative embodiments, the SIG symbol, e.g., the first SIG symbol, may include one or more parameters, which may be useful to legacy versions during an evolved packet transmission.

In some demonstrative embodiments, devices 102 and/or 140 may be configured to implement and/or support an NGV preamble including a flexible SIGA structure, which may be defined by a symbol count field, e.g., even without additional SIG fields. For example, the NGV preamble may be configured such as to remove a need for defining additional SIG fields, e.g., Signal B (SIGB) fields, for example, by having the flexible SIGA structure, e.g., as described below.

In some demonstrative embodiments, devices 102 and/or 140 may be configured to communicate an PPDU utilizing an NGV preamble, which may be configured to support use cases, which do not require one or more STF and/or LTF portions, which may not be required for one or more operation modes. For example, some operation modes, e.g., broadcast messaging, may utilize one stream and/or may not require support of beamforming.

In one example, low rate packets, e.g., mandatory broadcast messages and/or any other packets types, may utilize a single-stream PPDU. Accordingly, the NGV preamble may be configured to omit these additional STF and LTF portions, for example, VHT-STF and/or VHT-LTF, e.g., as may be required in accordance with an IEEE802.11ac Standard, for example, for single-spatial-stream transmissions.

In some demonstrative embodiments, for example, the NGV preamble may be configured, for example, even without using Very High Through put (VHT) STF (VHT-STF) and/or VHT-LTF fields, e.g., as described below.

In some demonstrative embodiments, the NGV preamble may include one or more SIG fields, for example, an L-SIG field and/or an RL-SIG filed, including training subcarriers, which may use one or more additional edge subcarriers of the L-SIG and/or RL-SIG fields, for example, to support removal of the STF and LTF portions. For example, the L-SIG and/or RL-SIG fields may implement a data subcarrier count, which may be extended, for example, from 48 (52 with pilots), to 52 (56 with pilots), e.g., as described below. In other embodiments, any other number of subcarriers may be used.

In some demonstrative embodiments, controller 124 may be configured to cause, trigger, and/or control an NGV STA implemented by device 102 to generate an NGV PPDU including an NGV preamble, e.g., as described below.

In some demonstrative embodiments, the NGV PPDU may be configured for a V2X communication, e.g., as described below.

In other embodiments, the NGV PPDU may be configured for any other additional or alternative type of vehicular communication.

In some demonstrative embodiments, the NGV PPDU may include a single-stream PPDU, e.g., as described below.

In some demonstrative embodiments, the NGV PPDU may include a multi-stream PPDU, e.g., as described below.

In some demonstrative embodiments, the NGV PPDU may include a broadcast PPDU, e.g., as described below.

In other embodiments, the NGV PPDU may include any other type of PPDU.

In some demonstrative embodiments, the NGV preamble may include a non High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the L-SIG field, e.g., as described below.

In some demonstrative embodiments, the NGV preamble may include an NGV Signal (NGV-SIG) field, for example, after the RL-SIG field, e.g., as described below.

In some demonstrative embodiments, the NGV-SIG field may include a version field configured to identify a version of the NGV PPDU, e.g., as described below.

In some demonstrative embodiments, controller 124 may be configured to cause, trigger, and/or control an NGV STA implemented by device 102 to transmit the NGV PPDU over an NGV channel in an NGV wireless communication frequency band, e.g., as described below.

In some demonstrative embodiments, the NGV channel may include a 10 MHz channel, e.g., as described below.

In some demonstrative embodiments, the NGV channel may include a 20 MHz channel, e.g., as described below.

In some demonstrative embodiments, the NGV channel may include two 10 MHz channels, e.g., as described below.

In some demonstrative embodiments, the NGV channel may include two duplicate 10 MHz channels, e.g., as described below.

In other embodiments, the NGV channel may include any other channel and/or any other combination of any other channels.

In some demonstrative embodiments, the NGV wireless communication frequency band may include a 5.9 GHz wireless communication frequency band, e.g., as described below.

In some demonstrative embodiments, the NGV wireless communication frequency band may include a band between 5.85 GHz and 5.925 GHz, e.g., as described below.

In some demonstrative embodiments, the NGV wireless communication frequency band may include a DSRC band, e.g., as described below.

In other embodiments, the NGV wireless communication frequency band may include any other wireless frequency band.

In some demonstrative embodiments, the NGV PPDU may include a data field after the NGV-SIG field, e.g., as described below. In other embodiments, the data field may be optional or may be omitted.

In some demonstrative embodiments, the L-STF, L-LTF, and/or L-SIG fields may be configured for decoding by non-NGV STAs, e.g., as described below.

In some demonstrative embodiments, the NGV-SIG field may be configured for decoding by NGV STAs, e.g., as described below.

In some demonstrative embodiments, the RL-SIG may include a repetition of the L-SIG field, e.g., in accordance with an IEEE802.11ax Standard, for example, with an option of using an overlay, e.g., if deemed useful.

In one example, a range extension may be achieved by an improved detection performance of the L-SIG field, for example, in addition to use of a lower MCS and/or repetition in the signal fields (SIG) and/or data portion of the PPDU.

In some demonstrative embodiments, the RL-SIG may be included, for example, in addition to a repeated data field like MCS10, e.g., in accordance with an IEEE 801.11ah Standard, and/or DCM, e.g., in accordance with an IEEE 801.11ax Standard.

In one example, the RL-SIG may allow utilizing more SIG bits in the NGV-SIG, e.g., even for all packets.

In some demonstrative embodiments, the NGV-SIG field may be immediately after the RL-SIG field, e.g., as described below.

In some demonstrative embodiments, the NGV preamble may include a plurality of NGV-SIG fields, for example, after the RL-SIG field, e.g., as described below.

In some demonstrative embodiments, the NGV preamble may include a first NGV-SIG field and a second NGV-SIG field after the first NGV-SIG field, e.g., as described below.

In some demonstrative embodiments, the NGV preamble may include a first NGV-SIG field immediately after the RL-SIG field, and at least one second NGV-SIG field after the first NGV-SIG field, e.g., as described below.

In some demonstrative embodiments, the first NGV-SIG field may include the version field, e.g., as described below.

In some demonstrative embodiments, the version field may optionally be included in at least one second NGV-SIG field after the first NGV-SIG field.

In some demonstrative embodiments, the NGV preamble may include a single NGV-SIG symbol, e.g., as described below.

In some demonstrative embodiments, the NGV preamble may include a plurality of NGV-SIG symbols, e.g., as described below In some demonstrative embodiments, the NGV preamble may include a repetition of the NGV-SIG field, e.g., as described below.

In some demonstrative embodiments, the first codeword of the NGV-SIG and/or the first NGV-SIG symbol(s) may be repeated in a time-domain, e.g., symbol by symbol, for example, with different interleavers; and/or in a frequency-domain, e.g., using DCM. For example, such a repetition of the NGV-SIG symbols may support an extended range for the reception of the parameters of a subsequent DCM data.

In some demonstrative embodiments, a second codeword of the NGV-SIG and/or a second NGV-SIG symbol(s) may be repeated, e.g., as a mandatory requirement. In other embodiments, there may be an indication in the first NGV-SIG symbol to indicate the repetition.

In some demonstrative embodiments, the NGV preamble may include a count field configured to indicate a count of NGV-SIG symbols in the NGV preamble, e.g., as described below.

In some demonstrative embodiments, the NGV preamble may include a symbol count field configured to indicate the count of NGV-SIG symbols in the NGV preamble, e.g., as described below.

In some demonstrative embodiments, the NGV-SIG symbol count may be indicated in the L-SIG field and/or the RL-SIG filed, for example, as it may take some time for a PHY of a receiver to decode the symbol(s), e.g., with Binary Convolutional Coding (BCC), and to extract the NGV-SIG symbol count.

In some demonstrative embodiments, the NGV-SIG symbol count may be indicated by the L-SIG field, for example, using a version bit, high MCS entry bits, and/or a "dirty bit", e.g., a value of a LENGTH field mod 3 may be set to indicate the NGV-SIG symbol count.

In some demonstrative embodiments, a second NGV-SIG codeword may be configured to have more than one symbol, for example, when the NGV-SIG symbol count is indicated by the first NGV-SIG codeword, for example, in order to tolerate a decoding latency of the first codeword.

In some demonstrative embodiments, the NGV-SIG field may include one or more types of information corresponding to the NGV PPDU, e.g., as described below.

In some demonstrative embodiments, the NGV-SIG field may include Modulation and Coding Scheme (MCS) information corresponding to the NGV PPDU.

In some demonstrative embodiments, the NGV-SIG field may include coding information corresponding to an encoding of the NGV PPDU.

In some demonstrative embodiments, the NGV-SIG field may include any other additional or alternative information.

In some demonstrative embodiments, the L-SIG field and/or the RL-SIG field, e.g., each of the L-SIG field and the RL-SIG field, may include training subcarriers, e.g., as described below.

In some demonstrative embodiments, the L-SIG field and/or the RL-SIG field, e.g., each of the L-SIG field and the RL-SIG field, may include 52 subcarriers, e.g., as described below.

In some demonstrative embodiments, the L-SIG field and/or the RL-SIG field, e.g., each of the L-SIG field and the RL-SIG field, may include 56 subcarriers, e.g., as described below.

In other embodiments, the L-SIG field and/or the RL-SIG field may utilize any other number of subcarriers.

In some demonstrative embodiments, the L-STF may include a first count of subcarriers, the L-SIG field and/or the RL-SIG field, e.g., each of the L-SIG field and the RL-SIG field, may include a second count of subcarriers, for example, greater than the first count of subcarriers, e.g., as described below.

In some demonstrative embodiments, the second count of subcarriers, e.g., in the L-SIG field and/or the RL-SIG field, may be equal to a count of subcarriers in the data field of the NGV PPDU, e.g., as described below.

In some demonstrative embodiments, the L-SIG and/or the RL-SIG may be configured to include training subcarriers, for example, to provide training symbols to extra subcarriers, which may be used in the data portion of the payload of the NGV PPDU, for example, to compensate for the possible omission of the VHT-STF and/or VHT-LTF fields.

In some demonstrative embodiments, the L-SIG and/or the RL-SIG may be configured to utilize training subcarriers, for example, by including additional edge subcarriers of the L-SI and/or RL-SIG fields, which may support unicast and/or broadcast PPDUs.

In some demonstrative embodiments, the implementation of the training subcarriers may expand a data subcarrier count by additional tones, for example, 4 additional tones or any other number of additional tones, e.g., from 48 (52 with pilots) tones, to 52 (56 with pilots) tones, or any other number of tones.

In some demonstrative embodiments, a transmission power for the training tones, e.g., the four additional tones, may be the same as the tones in the L-LTF, and/or in the L-SIS and/or RL-SIG symbols. For example, the total transmit power may be evenly distributed over the symbol tones, e.g., the 52 existing tones, and the training tones, e.g., the 4 additional tones.

In some demonstrative embodiments, the NGV-SIG field, which may immediately follow the RL-SIG field, may be configured to use a same number of tones as the L-SIG and/or RL-SIG fields, e.g., 56 subcarriers, which may allow an increased level of signaling.

In some demonstrative embodiments, the NGV-SIG field may include Cyclic Redundancy Check (CRC) information based on NGV-SIG field, e.g., as described below.

In some demonstrative embodiments, a CRC may be configured to protect the NGV-SIG, e.g., as described below.

In one example, the CRC may be configured to protect one NGV-SIG symbol, e.g., as described below.

In another example, the CRC may be configured to protect more than one NGV-SIG symbol, for example, even all NGV-SIG symbols, e.g., as described below.

In some demonstrative embodiments, a single CRC may be used for the entire NGV SIG field, e.g., when the CRC is to protect one NGV-SIG symbol.

In some demonstrative embodiments, a SIG symbol count may be included in the first NGV-SIG symbol or a second NGV-SIG symbol, e.g., if needed, for example, to allow for the possibility of future generations using more than the number of NGV-SIG symbols.

In one example, using a single CRC may be used for the entire NGV SIG field may be based on knowledge of a number of symbols in the NGV-SIG field, for example, since the count of symbols may be part of the first symbol and may have to be used before the CRC is checked.

In some demonstrative embodiments, at least one symbol, e.g., one symbol or two symbols, may be protected by a CRC, for example, when the CRC protects all the NGV-SIG symbols, e.g., as described below.

In some demonstrative embodiments, the number of symbols to be protected may be the number of symbols deemed necessary for a current NGV release, e.g., 2 symbols.

In some demonstrative embodiments, all devices, e.g., including devices based on future generations of the IEEE802.11 standard, may be required to detect and decode the NGV-SIG symbols and check the CRC.

In some demonstrative embodiments, for example, if one or more future NGV-SIG symbols may be utilized for future versions, then these future NGV-SIG symbols may follow the first two NGV-SIG symbols, and may be protected by another CRC.

In some demonstrative embodiments, a number of the "extra" future NGV-SIG symbols may be identified based on the SIG symbol count filed, which may be found, for example, in the first SIG symbol.

In some demonstrative embodiments, this design of the NGV-SIG field may allow NGV devices, e.g., of a version configured for up to two NGV-SIG symbols, to detect and decode one or two NGV-SIG symbols, and check the CRC. For example, these NGV devices may not have to wait to detect further NGV-SIG symbols, e.g., if future NGV-SIG symbols are added in a future version.

In some demonstrative embodiments, this design of the NGV-SIG field may support a flexible design, which may not require multiple SIG field types to be used based on packet type. As a result, a need of a SIGB field may be avoided.

In some demonstrative embodiments, the NGV preamble may include an NGV STF (NGV-STF), for example, in addition to the fields described above, e.g., as described below.

In some demonstrative embodiments, the NGV-STF may be after the NGV-SIG field, e.g., as described below.

In some demonstrative embodiments, the NGV preamble may include an NGV LTF (NGV-LTF), for example, in addition to the fields described above, e.g., as described below.

In some demonstrative embodiments, the NGV LTF may be after the NGV-STF field, e.g., as described below.

In some demonstrative embodiments, the NGV preamble may be configured to include information of one or more parameters, e.g., key parameters, which may be required in all future evolutions. In one example, the information on these parameters may be defined as part of the first one or more NGV-SIG symbols, e.g., the first NGV-SIG symbol or the first and second NGV-SIG symbols.

In some demonstrative embodiments, the revision number, and/or potentially a mode identifier, e.g., if the system requires several packet types, may be encapsulated in the first NGV-SIG.

In some demonstrative embodiments, a decoding latency of the revision number may be taken into consideration. For example, a second NGV-SIG codeword may have a fixed length, for example, for accommodating the decoding latency, e.g., if the revision number and/or symbol count is to be included in the first codeword.

In some demonstrative embodiments, a third NGV-SIG codeword and/or any other additional number of NGV-SIG codewords, may be used, for example, for additional NGV-SIG information.

In some demonstrative embodiments, additional NGV-SIG symbols, may be added, for example, based on required information for newer versions. For example, the additional NGV-SIG symbols following the first symbol may be indicated based on the revision number.

Figure 2:
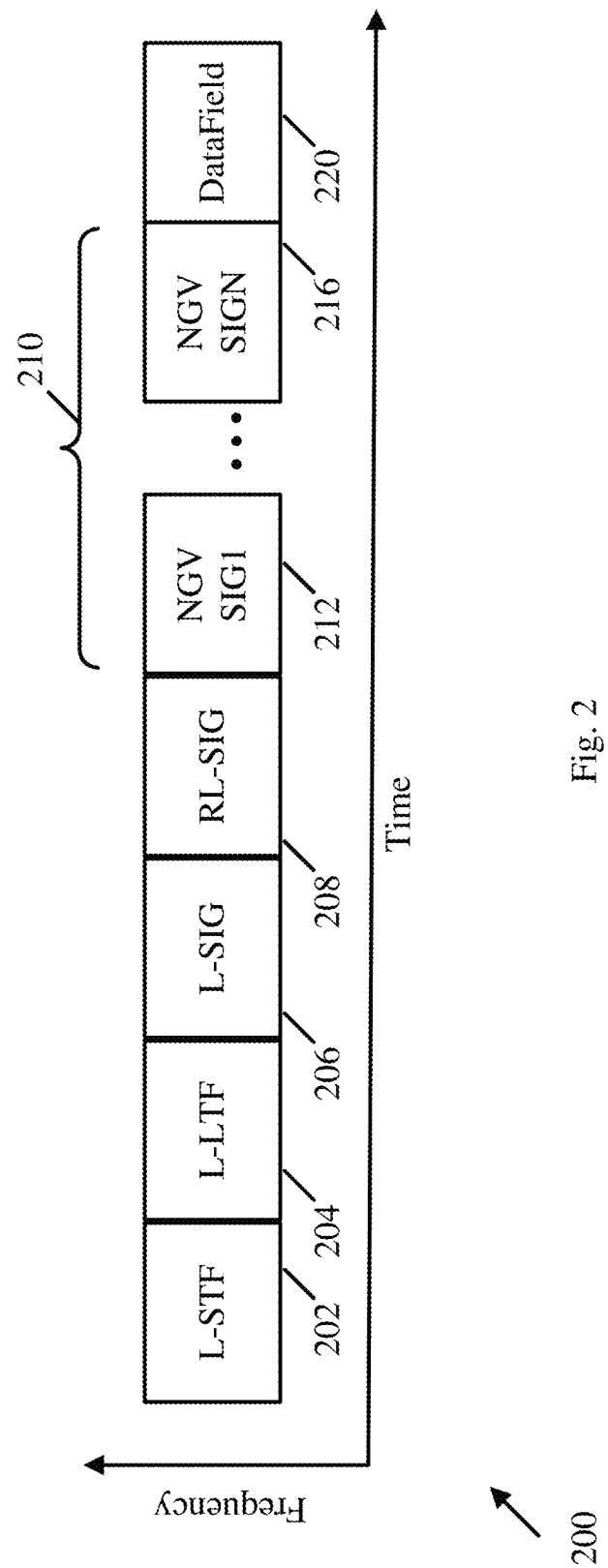
FIG. 2 is a schematic illustration of elements of a Next Generation Vehicular (NGV) Physical Layer (PHY) Protocol Data Unit (PPDU) format, in accordance with some demonstrative embodiments.

Reference is made to FIG. 2, which schematically illustrates an NGV PPDU format 200, in accordance with some demonstrative embodiments. In one example, devices 102 (FIG. 1) and/or 140 (FIG. 1) may be configured to generate, transmit, receive and/or process one or more NGV PPDUs having the structure and/or format of NGV PPDU 200.

In one example, devices 102 (FIG. 1) and/or 140 (FIG. 1) may communicate NGV PPDU 200, for example, as part of a transmission over a channel, e.g., an NGV channel, in an NGV wireless communication frequency, e.g., as described above.

In one example, NGV PPDU format 300 may be used for transmission of an NGV packet over an NGV channel of 10MHZ.

In one example, NGV PPDU format 300 may be used for transmission of an NGV packet including a single-stream PPDU.

In one example, NGV PPDU format 200 may be configured for transmission of an NGV packet having a low transmission rate. For example, NGV PPDU format 200 may be used for a broadcast NGV PPDU.

In another example, NGV PPDU format 200 may be used for any other type of packet.

In some demonstrative embodiments, as shown in FIG. 2, NGV PPDU 200 may include an NGV preamble including an L-STF 202, an L-LTF 204 after the L-STF 202, an L-SIG field 206 after the L-LTF 204, an RL-SIG field 208 after the L-SIG field 206, and an NGV-SIG field 212 after the RL-SIG field 208.

In some demonstrative embodiments, as shown in FIG. 2, the NGV-SIG field 212 may be immediately after the RL-SIG field 208.

In some demonstrative embodiments, as shown in FIG. 2, NGV PPDU 200 may include a data field 220 after the NGV-SIG field 212.

In some demonstrative embodiments, as shown in FIG. 2, NGV PPDU 200 may include a plurality of NGV-SIG fields 210 after the RL-SIG field 208.

In some demonstrative embodiments, as shown in FIG. 2, the plurality of NGV-SIG fields 210 may include a first NGV-SIG field, e.g., NGV-SIG field 210, and at least one second NGV-SIG field, e.g., NGV-SIG field 216.

In some demonstrative embodiments, the L-STF 202, L-LTF 204, and/or L-SIG field 206 may be configured for decoding by non-NGV STAs, e.g., non-HT STAs.

In some demonstrative embodiments, the NGV-SIG fields 212 and/or 210 may be configured for decoding by NGV STAs.

In some demonstrative embodiments, NGV PPDU 200 may include some or all of the fields shown in FIG. 2 and/or one or more other additional or alternative fields.

Figure 3:
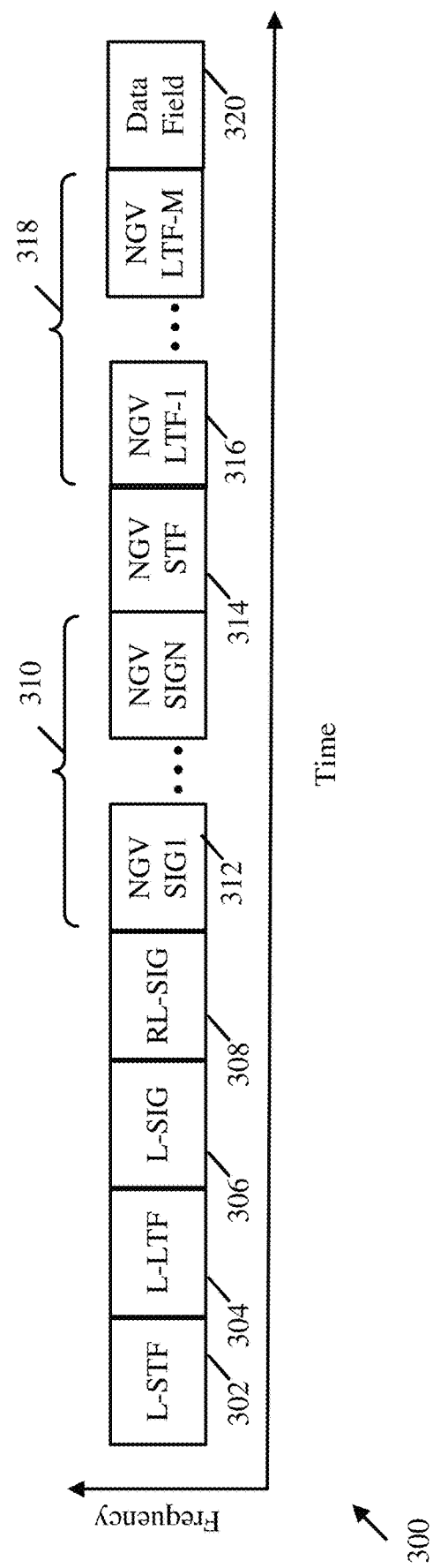
FIG. 3 is a schematic illustration of elements of an NGV PPDU format, in accordance with some demonstrative embodiments.

Reference is made to FIG. 3, which schematically illustrates an NGV PPDU format 300, in accordance with some demonstrative embodiments. In one example, devices 102 (FIG. 1) and/or 140 (FIG. 1) may be configured to generate, transmit, receive and/or process one or more NGV PPDUs having the structure and/or format of NGV PPDU 300.

In one example, devices 102 (FIG. 1) and/or 140 (FIG. 1) may communicate NGV PPDU 300, for example, as part of a transmission over a channel, e.g., an NGV channel, in an NGV wireless communication frequency band, e.g., as described above.

In one example, NGV PPDU format 300 may be used for transmission of an NGV packet over an NGV channel of 20MHZ.

In one example, NGV PPDU format 300 may be used for transmission of an NGV packet including a multi-stream PPDU.

In another example, NGV PPDU format 300 may be used for any other type of packet.

In some demonstrative embodiments, as shown in FIG. 3, NGV PPDU 300 may include an NGV preamble including an L-STF 302, an L-LTF 304 after the L-STF 302, an L-SIG field 306 after the L-LTF 304, an RL-SIG field 308 after the L-SIG field 306, and an NGV-SIG field 312 after the RL-SIG field 308.

In some demonstrative embodiments, as shown in FIG. 3, a first NGV-SIG field 312 may be immediately after the RL-SIG field 308.

In some demonstrative embodiments, as shown in FIG. 3, NGV PPDU 300 may include a plurality of NGV-SIG fields 310 after the RL-SIG field 308.

In some demonstrative embodiments, as shown in FIG. 3, NGV PPDU 300 may include an NGV STF 314 after the NGV-SIG field 312.

In some demonstrative embodiments, as shown in FIG. 3, NGV PPDU 300 may include an NGV LTF 316 after the NGV-STF field 314.

In some demonstrative embodiments, as shown in FIG. 3, NGV PPDU 300 may include a plurality of NGV-LTF fields 318.

In some demonstrative embodiments, as shown in FIG. 3, NGV PPDU 300 may include a data field 320 after the NGV-SIG field 312, e.g., after the fields 314 and 318.

In some demonstrative embodiments, the L-STF 302, L-LTF 304, and/or L-SIG field 306 may be configured for decoding by non-NGV STAs, e.g., non-HT STAs.

In some demonstrative embodiments, the NGV-SIG fields 312 and/or 310, the NGV STF 314, and/or NGV LTF fields 316 and/or 318, may be configured for decoding by NGV STAs.

In some demonstrative embodiments, NGV PPDU 300 may include some or all of the fields shown in FIG. 3 and/or one or more other additional or alternative fields.

Figure 4:
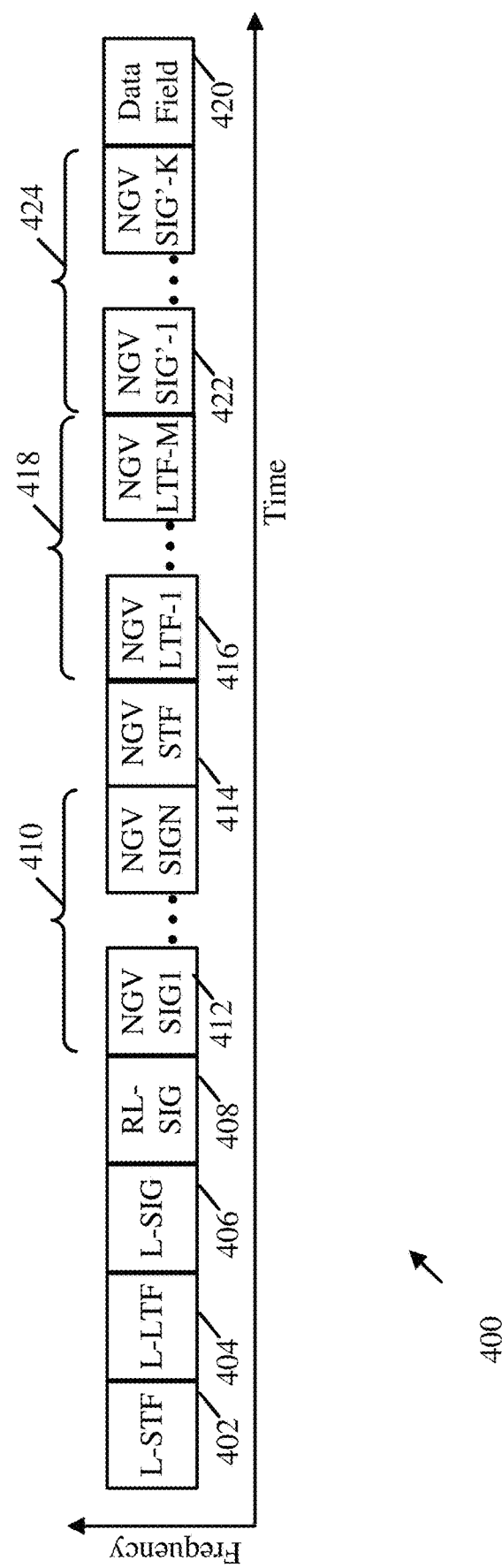
FIG. 4 is a schematic illustration of elements of an NGV PPDU format, in accordance with some demonstrative embodiments.

Reference is made to FIG. 4, which schematically illustrates an NGV PPDU format 400, in accordance with some demonstrative embodiments. In one example, devices 102

(FIG. 1) and/or 140 (FIG. 1) may be configured to generate, transmit, receive and/or process one or more NGV PPDUs having the structure and/or format of NGV PPDU 400.

In one example, devices 102 (FIG. 1) and/or 140 (FIG. 1) may communicate NGV PPDU 400, for example, as part of a transmission over a channel, e.g., an NGV channel, in an NGV wireless communication frequency band, e.g., as described above.

In one example, NGV PPDU format 400 may be used for transmission of an NGV packet over an NGV channel of 20MHZ.

In another example, NGV PPDU format 400 may be used for any other type of packet.

In some demonstrative embodiments, as shown in FIG. 4, NGV PPDU 400 may include an NGV preamble including an L-STF 402, an L-LTF 404 after the L-STF 402, an L-SIG field 406 after the L-LTF 404, and an RL-SIG field 408 after the L-SIG field 406.

In some demonstrative embodiments, as shown in FIG. 4, NGV PPDU 400 may include a plurality of NGV-SIG fields 410 after the RL-SIG field 408.

In some demonstrative embodiments, as shown in FIG. 4, NGV PPDU 400 may include a first NGV-SIG field 412 after the RL-SIG field 408.

In some demonstrative embodiments, as shown in FIG. 4, the first NGV-SIG field 412 may be immediately after the RL-SIG field 408.

In some demonstrative embodiments, as shown in FIG. 4, NGV PPDU 400 may include a second NGV-SIG field 422 after first NGV-SIG field 412.

In some demonstrative embodiments, as shown in FIG. 4, NGV PPDU 400 may include a plurality of second NGV-SIG fields 424 after first NGV-SIG field 412.

In some demonstrative embodiments, as shown in FIG. 4, NGV PPDU 400 may include an NGV-TF 414 after the NGV-SIG field 412.

In some demonstrative embodiments, as shown in FIG. 4, NGV PPDU 400 may include an NGV-LTF 416 after the NGV-STF field 414.

In some demonstrative embodiments, as shown in FIG. 4, NGV PPDU 400 may include a plurality of NGV-LTF fields 418.

In some demonstrative embodiments, as shown in FIG. 4, NGV PPDU 400 may include a data field 420 after the NGV-SIG field 412, e.g., after NGV-SIG fields 424.

In some demonstrative embodiments, as shown in FIG. 4, the NGV-SIG symbols may be partitioned into two parts, e.g., the first NGV-SIG fields 410 and the second NGV-SIG fields 424. For example, NGV-SIG field 410 may be before NGV-LTF 418, and the one or more NGV-SIG fields 4242 may be after the NGV-LTF fields 418.

In some demonstrative embodiments, first NGV-SIG field 410 may be configured to use two duplicated 10 MHz channels, for example, for a payload of the NGV-SIG field 410.

In some demonstrative embodiments, second NGV-SIG fields 424 may use a full 20 MHz channel for the payload.

In some demonstrative embodiments, the L-STF 402, L-LTF 404, and/or L-SIG fields 406 may be configured for decoding by non-NGV STAs, e.g., non-HT STAs.

In some demonstrative embodiments, the first NGV-SIG fields 410 and/or the second NGV-SIG fields 424 may be configured for decoding by NGV STAs.

In some demonstrative embodiments, NGV PPDU 400 may include some or all of the fields shown in FIG. 4 and/or one or more other additional or alternative fields.

Figure 5:
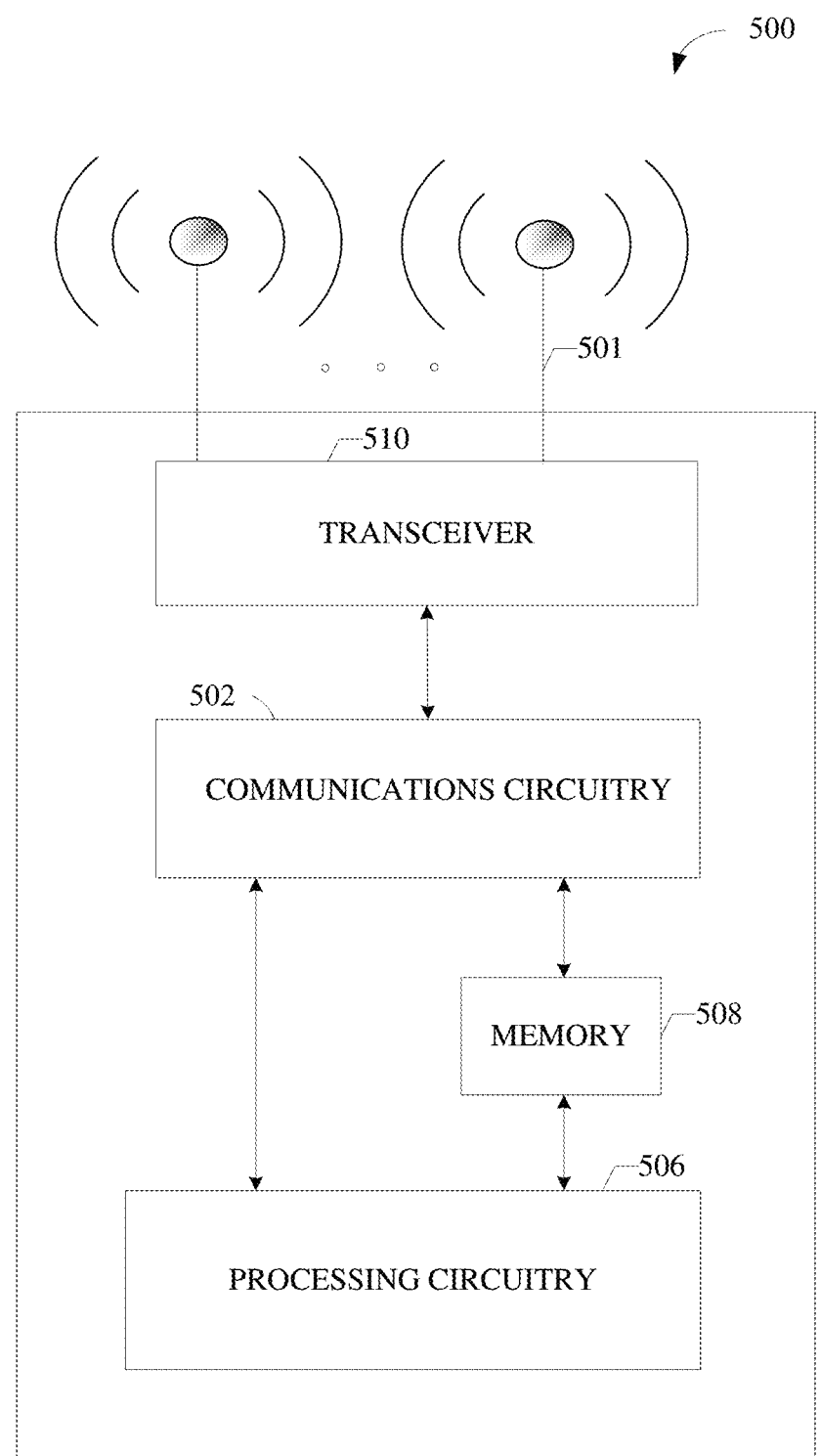
FIG. 5 illustrates a functional diagram of an exemplary communication station, which may be implemented in accordance with some demonstrative embodiments.

FIG. 5 shows a functional diagram of an exemplary communication station 500, in accordance with one or more example embodiments of the present disclosure. In one embodiment, FIG. 5 illustrates a functional block diagram of a communication station that may be suitable for use as device 102 (FIG. 1) and/or device 140 (FIG. 1) in accordance with some embodiments. For example, device 102 (FIG. 1) may include one or more, e.g., some or all, of the components and/or elements of communication station 500. The communication station 500 may also be suitable for use as a vehicular device, a handheld device, a mobile device, a portable device, a wireless device, a vehicular system device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable or non-portable wireless communication device, such as a vehicular device, a handheld device, a mobile device, a portable device, a wireless device, a vehicular system device, personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
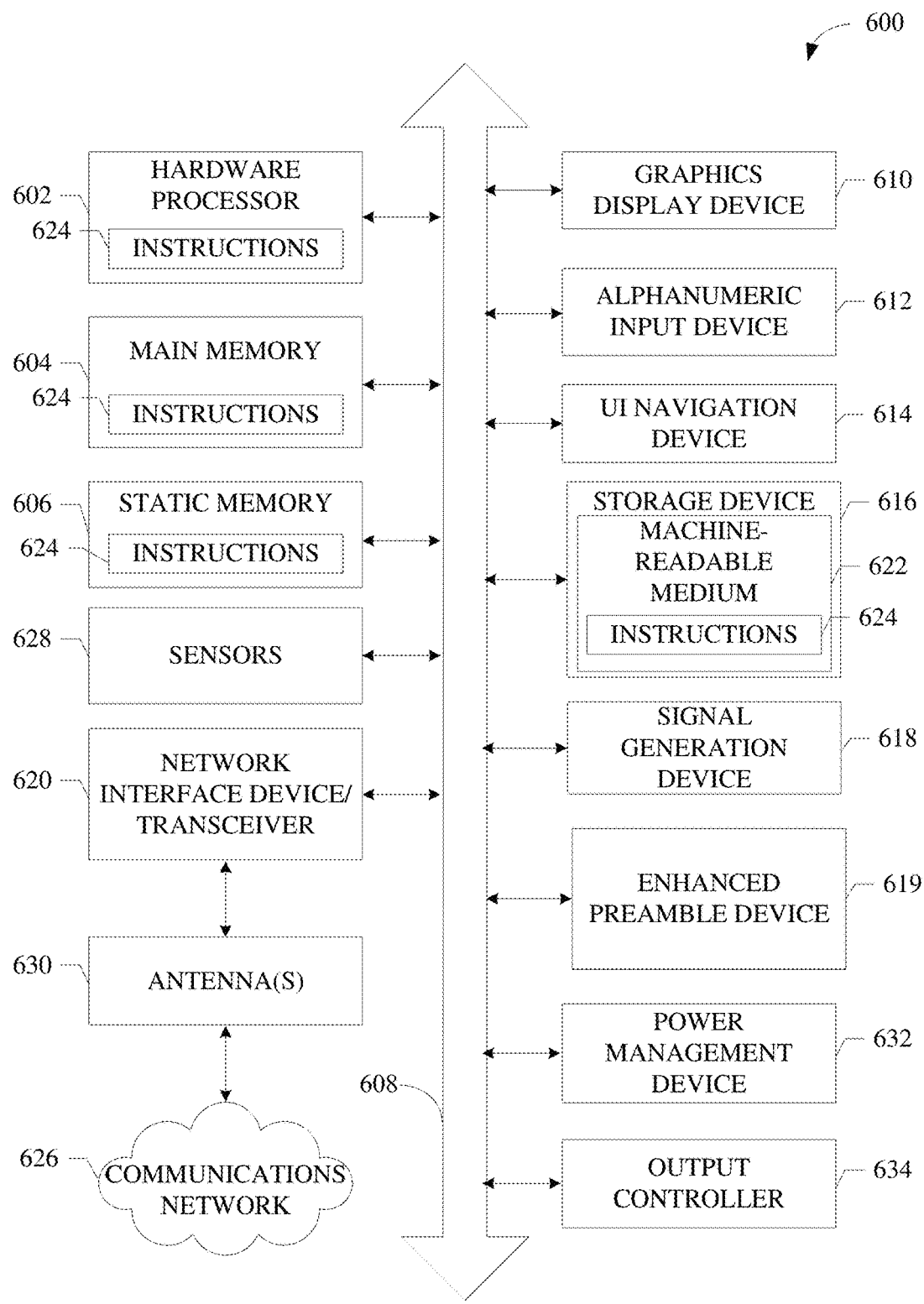
FIG. 6 illustrates a block diagram of an example machine upon which any of one or more techniques (e.g., methods) may be performed, in accordance with some demonstrative embodiments.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

In one example, device 102 (FIG. 1) and/or device 140 (FIG. 1) may include one or more, e.g., some or all, of the elements and/or components of machine 600.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an enhanced preamble device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the enhanced preamble device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced preamble device 619 may carry out or perform any of the operations and processes described and shown above.

It is understood that the above are only a subset of what the enhanced preamble device 6619 may be configured to perform and that other functions included throughout this disclosure may also be performed by the enhanced preamble device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
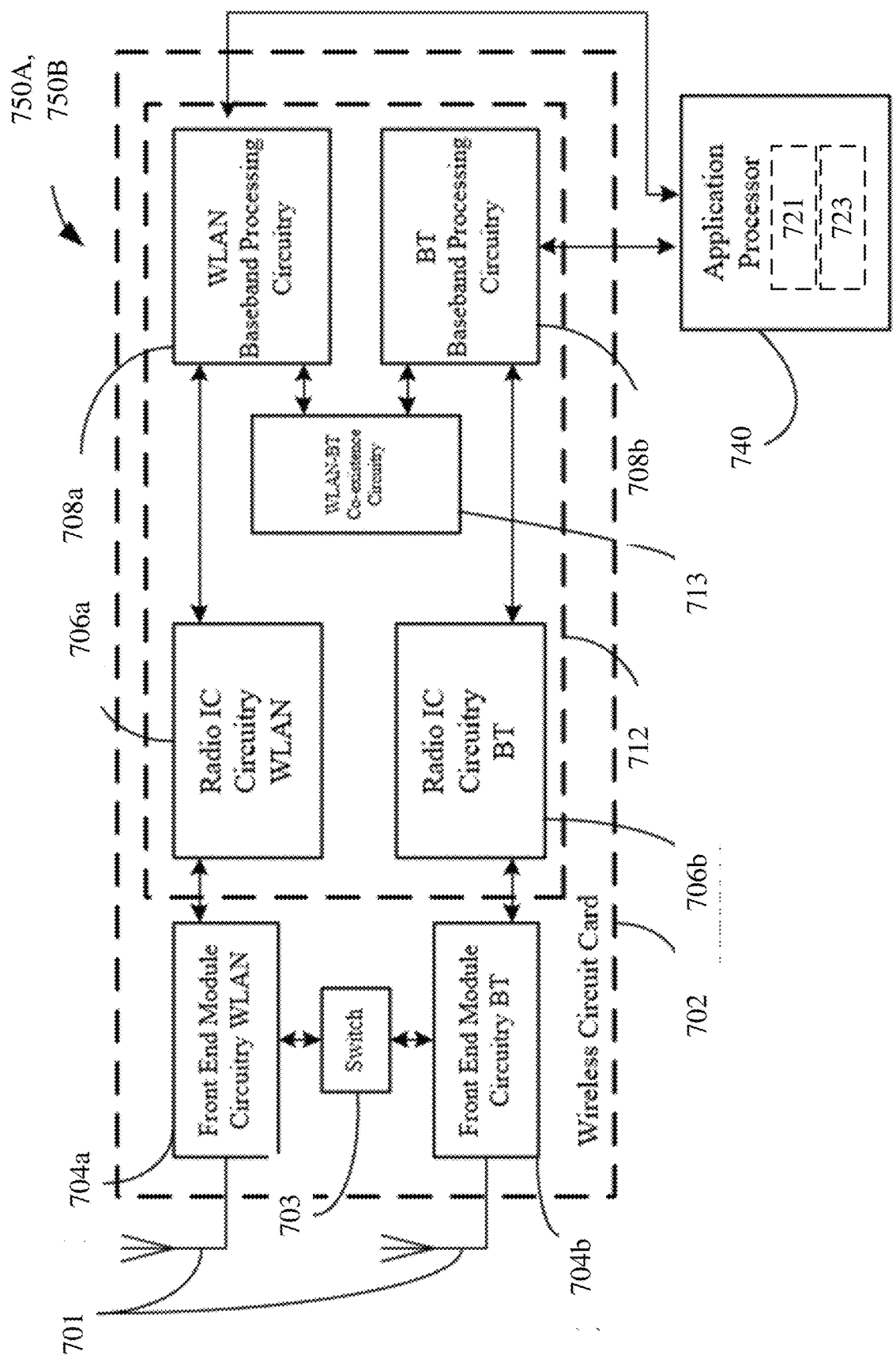
FIG. 7 is a block diagram of a radio architecture in accordance with some demonstrative embodiments.

FIG. 7 is a block diagram of a radio architecture 750A, 750B in accordance with some embodiments that may be implemented in any one of the STAs 102 and/or 140 of FIG. 1. Radio architecture 750A, 750B may include radio front-end module (FEM) circuitry 704a-b, radio IC circuitry 706a-b and baseband processing circuitry 708a-b. Radio architecture 750A, 750B as shown includes both Wireless Local Area Network (WLAN) functionality and Bluetooth (BT) functionality although embodiments are not so limited. In this disclosure, "WLAN" and "Wi-Fi" are used interchangeably.

In one example, device 102 (FIG. 1) and/or device 140 (FIG. 1) may include, and/or implement one or more, e.g., some or all, of the components and/or elements of a radio architecture 750A, 750B.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas 701. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 750A, 750B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 750A, 750B may be part of a Wi-Fi communication station (STA) such as a wireless access point (AP), a base station or a mobile device including a Wi-Fi device. In some of these embodiments, radio architecture 750A, 750B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 750A, 750B may also be suitable to transmit and/or receive communications in accordance with other techniques and standards.

In some embodiments, the radio architecture 750A, 750B may be configured for high-efficiency Wi-Fi (HEW) communications in accordance with the IEEE 802.11ax standard. In these embodiments, the radio architecture 750A, 750B may be configured to communicate in accordance with an OFDMA technique, although the scope of the embodiments is not limited in this respect.

In some other embodiments, the radio architecture 750A, 750B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 750A, 750B may include other radio cards, such as a cellular radio card configured for cellular (e.g., 5GPP such as LTE, LTE-Advanced or 7G communications).

In some IEEE 802.11 embodiments, the radio architecture 750A, 750B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
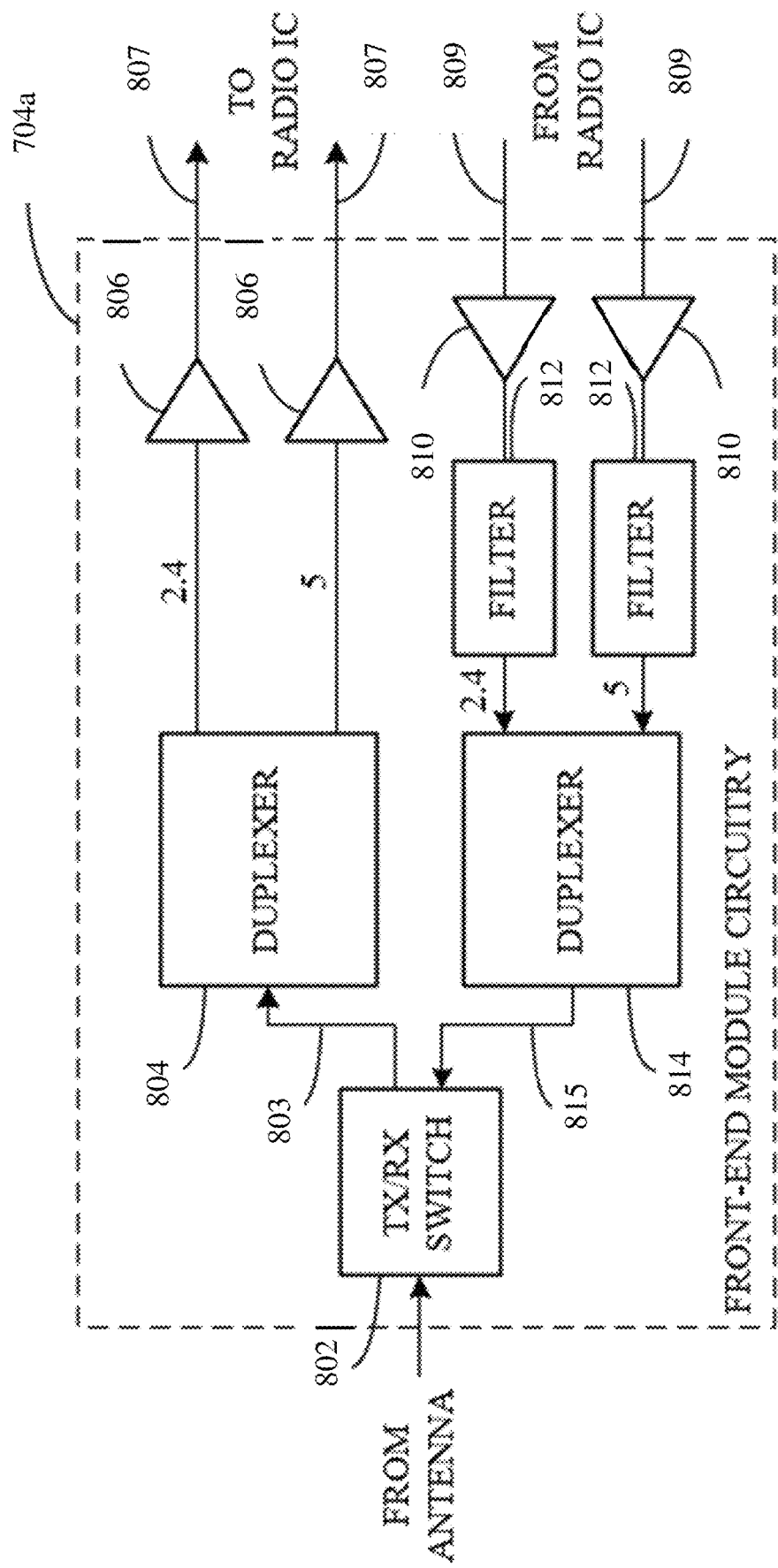
FIG. 8 illustrates an example front-end module circuitry for use in the radio architecture of FIG. 7, in accordance with some demonstrative embodiments.

FIG. 8 illustrates WLAN FEM circuitry 704*a* (FIG. 7) in accordance with some embodiments. Although the example of FIG. 8 is described in conjunction with the WLAN FEM circuitry 704*a*, the example of FIG. 8 may be described in conjunction with the example BT FEM circuitry 704*b* (FIG. 7), although other circuitry configurations may also be suitable.

In some embodiments, the FEM circuitry 704*a* may include a TX/RX switch 802 to switch between transmit mode and receive mode operation. The FEM circuitry 704*a* may include a receive signal path and a transmit signal path. The receive signal path of the FEM circuitry 704*a* may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704*a* may be configured to operate in either the 2.4 GHz frequency spectrum or the 5 GHz frequency spectrum. In these embodiments, the receive signal path of the FEM circuitry 704*a* may include a receive signal path duplexer 804 to separate the signals from each spectrum as well as provide a separate LNA 806 for each spectrum as shown. In these embodiments, the transmit signal path of the FEM circuitry 704*a* may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704*a* as the one used for WLAN communications.

Figure 9:
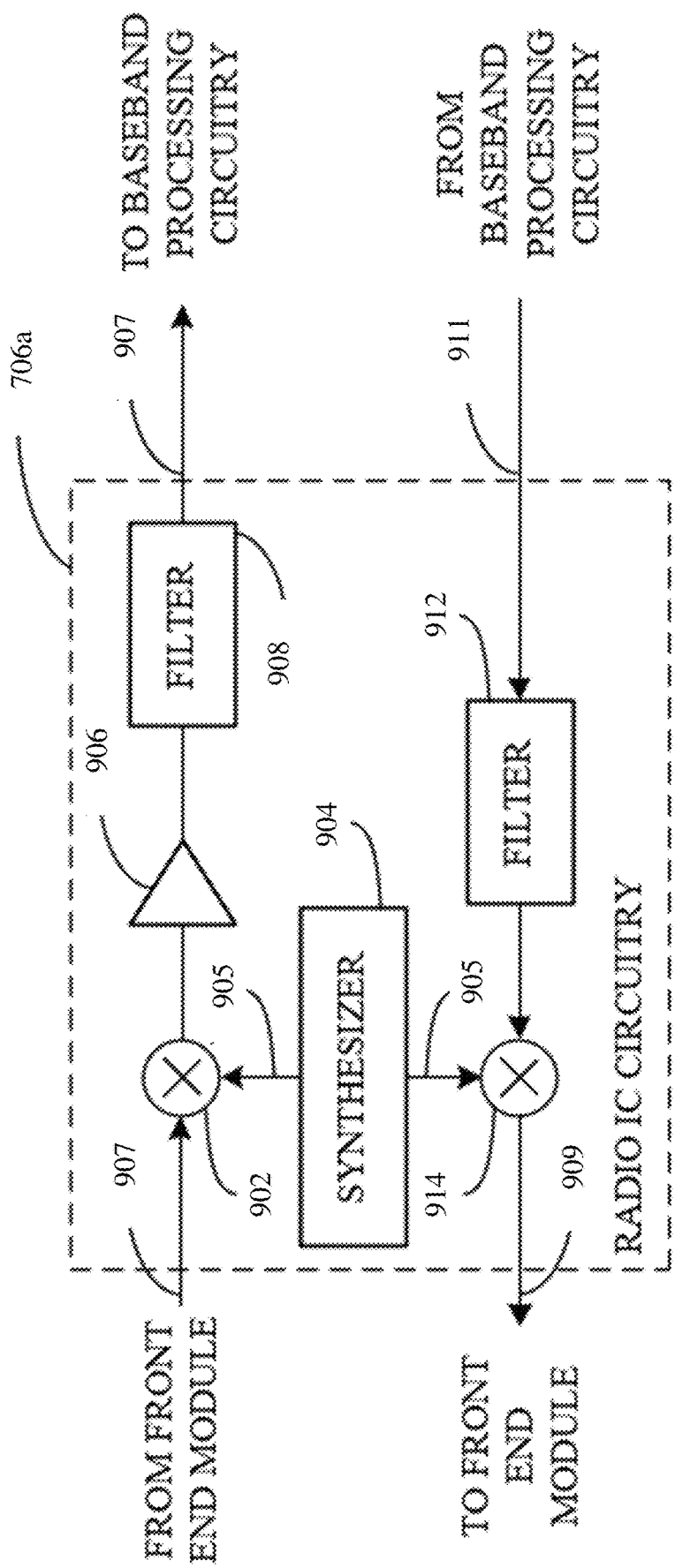
FIG. 9 illustrates an example radio circuitry for use in the radio architecture of FIG. 7, in accordance with some demonstrative embodiments.

FIG. 9 illustrates radio IC circuitry 706*a* (FIG. 7) in accordance with some embodiments. The radio IC circuitry 706*a* is one example of circuitry that may be suitable for use as the WLAN or BT radio IC circuitry 706*a*/706*b* (FIG. 7), although other circuitry configurations may also be suitable. Alternatively, the example of FIG. 9 may be described in conjunction with the example BT radio IC circuitry 706*b*.

In some embodiments, the radio IC circuitry 706*a* may include a receive signal path and a transmit signal path. The receive signal path of the radio IC circuitry 706*a* may include at least mixer circuitry 902, such as, for example, down-conversion mixer circuitry, amplifier circuitry 906 and filter circuitry 908. The transmit signal path of the radio IC circuitry 706*a* may include at least filter circuitry 912 and mixer circuitry 914, such as, for example, up-conversion mixer circuitry. Radio IC circuitry 706*a* may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704*a-b* (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708*a-b* (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704*a-b*. The baseband signals 911 may be provided by the baseband processing circuitry 708*a-b* and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 8 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9).

In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708*a-b* (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 721 or the example received signal converter 723 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
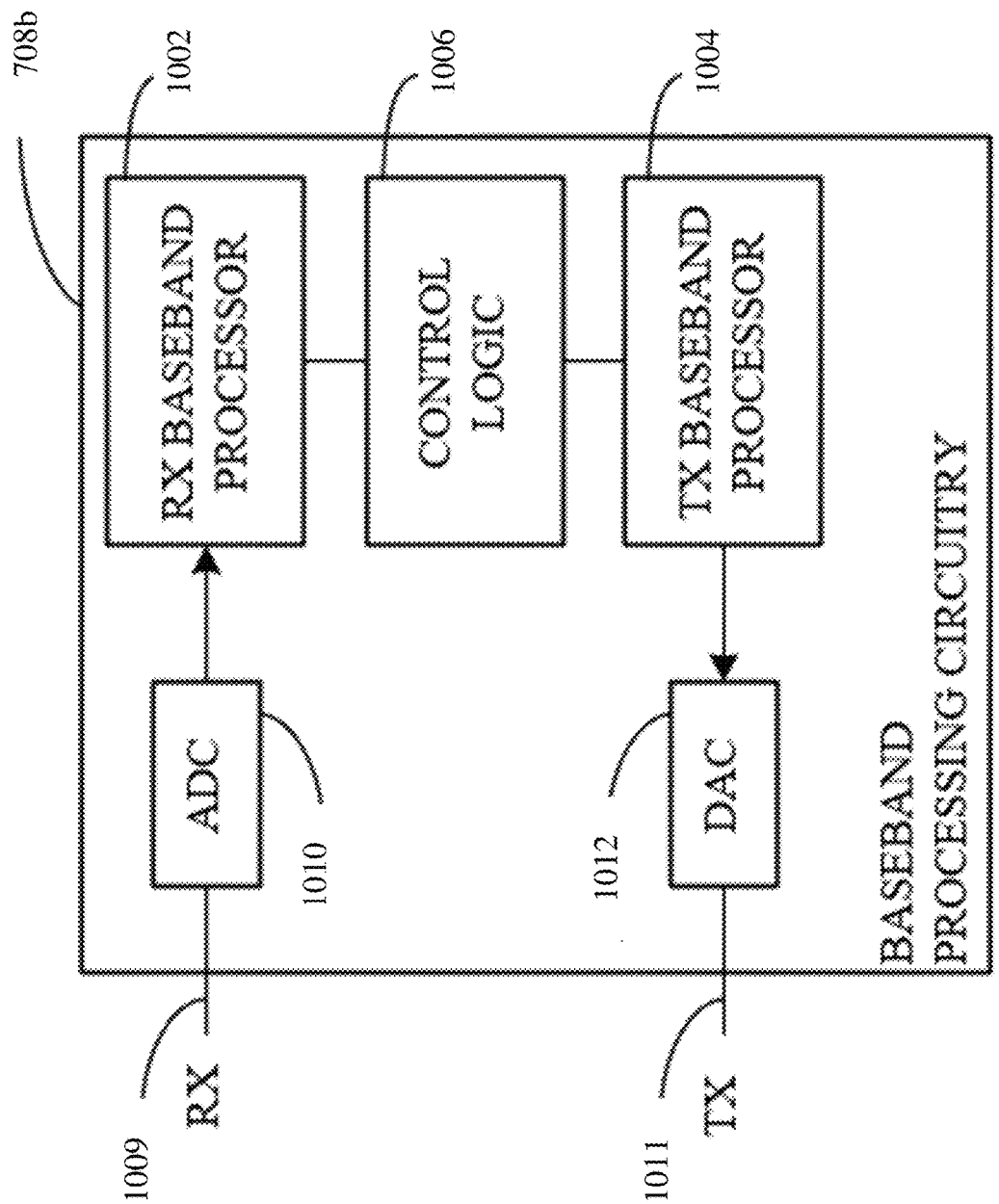
FIG. 10 illustrates an example baseband processing circuitry for use in the radio architecture of FIG. 7, in accordance with some demonstrative embodiments.

FIG. 10 illustrates a functional block diagram of baseband processing circuitry 708*a* (FIG. 7) in accordance with some embodiments. The baseband processing circuitry 708*a* is one example of circuitry that may be suitable for use as the baseband processing circuitry 708*a* (FIG. 7), although other circuitry configurations may also be suitable. Alternatively, the example of FIG. 10 may be used to implement the example BT baseband processing circuitry 708*b* of FIG. 7.

The baseband processing circuitry 708*a* may include a receive baseband processor (RX BBP) 1002 for processing receive baseband signals 909 provided by the radio IC circuitry 706*a-b* (FIG. 7) and a transmit baseband processor (TX BBP) 1004 for generating transmit baseband signals 911 for the radio IC circuitry 706*a-b*. The baseband processing circuitry 708*a* may also include control logic 1006 for coordinating the operations of the baseband processing circuitry 708*a*.

In some embodiments (e.g., when analog baseband signals are exchanged between the baseband processing circuitry 708*a-b* and the radio IC circuitry 706*a-b*), the baseband processing circuitry 708*a* may include ADC 1010 to convert analog baseband signals 1009 received from the radio IC circuitry 706*a-b* to digital baseband signals for processing by the RX BBP 1002. In these embodiments, the baseband processing circuitry 708*a* may also include DAC 1012 to convert digital baseband signals from the TX BBP 1004 to analog baseband signals 1011.

In some embodiments that communicate OFDM signals or OFDMA signals, such as through baseband processor 708*a*, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 750A, 750B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 11:
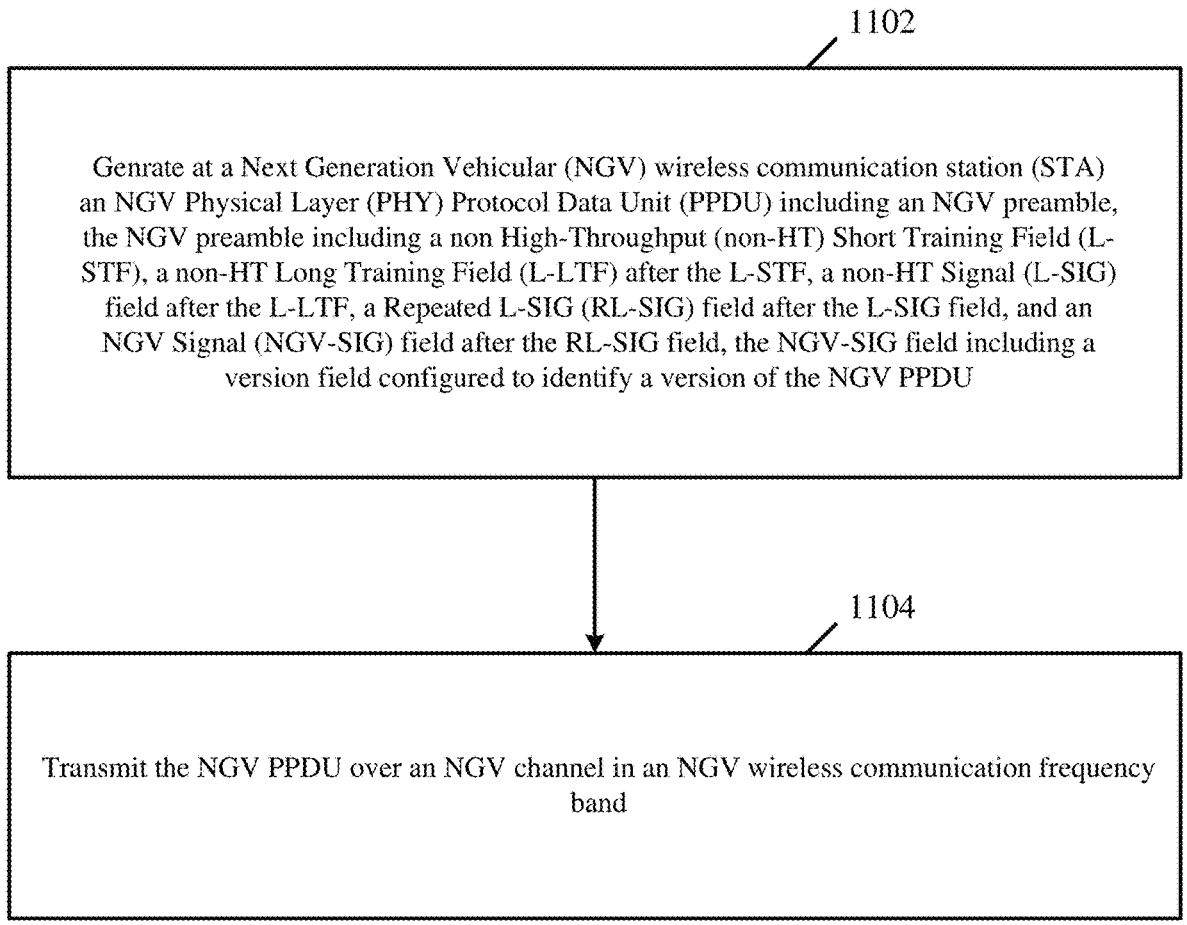
FIG. 11 is a schematic flow-chart illustration of a method of communicating an NGV PPDU, in accordance with some demonstrative embodiments.

Reference is made to FIG. 11, which schematically illustrates a method of communicating an NGV PPDU, in accordance with some demonstrative embodiments. For example, one or more of the operations of the method of FIG. 11 may be performed by one or more elements of a system, e.g., system 100 (FIG. 1), for example, one or more devices, e.g., device 102 (FIG. 1) and/or device 140 (FIG. 1), a controller, e.g., controller 124 (FIG. 1), a radio, e.g., radio 114 (FIG. 1), and/or a message processor, e.g., message processor 128 (FIG. 1).

As indicated at block 1102, the method may include generating at an NGV STA an NGV PPDU including an NGV preamble. The NGV preamble may include an L-STF, an L-LTF after the L-STF, an L-SIG field after the L-LTF, an RL-SIG field after the L-SIG field, and an NGV-SIG field after the RL-SIG field. The NGV-SIG field may include a version field configured to identify a version of the NGV PPDU. For example, controller 124 (FIG. 1) may be configured to cause, trigger, and/or control device 102 (FIG. 1) to generate the NGV PPDU, e.g., as described above.

As indicated at block 1102, the method may include transmitting the NGV PPDU over an NGV channel in an NGV wireless communication frequency band. For example, controller 124 (FIG. 1) may be configured to cause, trigger, and/or control device 102 (FIG. 1) to transmit the NGV PPDU over the NGV channel in the NGV wireless communication frequency band, e.g., as described above.

Figure 12:
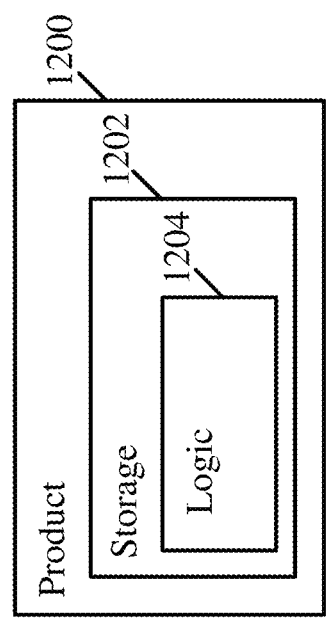
FIG. 12 is a schematic illustration of a product of manufacture, in accordance with some demonstrative embodiments.

Reference is made to FIG. 12, which schematically illustrates a product of manufacture 1200, in accordance with some demonstrative embodiments. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at device 102 (FIG. 1), radio 114 (FIG. 1), transmitter 118 (FIG. 1), receiver 116 (FIG. 1), message processor 128 (FIG. 1), and/or controller 124 (FIG. 1), to cause device 102 (FIG. 1), radio 114 (FIG. 1), transmitter 118 (FIG. 1), receiver 116 (FIG. 1), message processor 128 (FIG. 1), and/or controller 124 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, 9, 10, and/or 11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 1200 and/or machine readable storage media 1202 may include one or more types of computer-readable storage media capable of storing data, including volatile memory, non-volatile memory, removable or non-removable memory, erasable or non-erasable memory, writeable or re-writeable memory, and the like. For example, machine readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a processor comprising logic and circuitry configured to cause a Next Generation Vehicular (NGV) wireless communication station (STA) to generate an NGV Physical Layer (PHY) Protocol Data Unit (PPDU) comprising an NGV preamble, the NGV preamble comprising a non High-Throughput (non-HT) Short Training Field (L-STF), a non-HT Long Training Field (L-LTF) after the L-STF, a non-HT Signal (L-SIG) field after the L-LTF, a Repeated L-SIG (RL-SIG) field after the L-SIG field, and an NGV Signal (NGV-SIG) field after the RL-SIG field, the NGV-SIG field comprising a version field configured to identify a version of the NGV PPDU; and transmit the NGV PPDU over an NGV channel in an NGV wireless communication frequency band; and a memory to store information processed by the processor.

Example 2 includes the subject matter of Example 1, and optionally, wherein the NGV-SIG field is immediately after the RL-SIG field.

Example 3 includes the subject matter of Example 1 or 2, and optionally, wherein the NGV preamble comprises a first NGV-SIG field immediately after the RL-SIG field, and a second NGV-SIG field after the first NGV-SIG field.

Example 4 includes the subject matter of Example 3, and optionally, wherein the first NGV-SIG field comprises the version field.

Example 5 includes the subject matter of any one of Examples 1-4, and optionally, wherein the NGV preamble comprises a plurality of NGV-SIG fields after the RL-SIG field.

Example 6 includes the subject matter of any one of Examples 1-5, and optionally, wherein the NGV preamble comprises a single NGV-SIG symbol.

Example 7 includes the subject matter of any one of Examples 1-5, and optionally, wherein the NGV preamble comprises a plurality of NGV-SIG symbols.

Example 8 includes the subject matter of any one of Examples 1-7, and optionally, wherein the NGV preamble comprises a repetition of the NGV-SIG field.

Example 9 includes the subject matter of any one of Examples 1-8, and optionally, wherein the NGV preamble comprises a count field configured to indicate a count of NGV-SIG symbols in the NGV preamble.

Example 10 includes the subject matter of any one of Examples 1-9, and optionally, wherein the NGV-SIG field comprises a symbol count field configured to indicate a count of NGV-SIG symbols in the NGV preamble.

Example 11 includes the subject matter of any one of Examples 1-10, and optionally, wherein the L-STF comprises a first count of subcarriers, and wherein each of the L-SIG field and the RL-SIG field comprises a second count of subcarriers, wherein the second count of subcarriers is greater than the first count of subcarriers.

Example 12 includes the subject matter of Example 11, and optionally, wherein the second count of subcarriers is equal to a count of subcarriers in a data field of the NGV PPDU.

Example 13 includes the subject matter of any one of Examples 1-12, and optionally, wherein each of the L-SIG field and the RL-SIG field comprises 52 subcarriers.

Example 14 includes the subject matter of any one of Examples 1-12, and optionally, wherein each of the L-SIG field and the RL-SIG field comprises 56 subcarriers.

Example 15 includes the subject matter of any one of Examples 1-14, and optionally, wherein each of the L-SIG field and the RL-SIG field comprises training subcarriers.

Example 16 includes the subject matter of any one of Examples 1-15, and optionally, wherein the NGV-SIG field comprises Cyclic Redundancy Check (CRC) information based on NGV-SIG field.

Example 17 includes the subject matter of any one of Examples 1-16, and optionally, wherein the NGV-SIG field comprises Modulation and Coding Scheme (MCS) information corresponding to the NGV PPDU.

Example 18 includes the subject matter of any one of Examples 1-17, and optionally, wherein the NGV-SIG field comprises coding information corresponding to an encoding of the NGV PPDU.

Example 19 includes the subject matter of any one of Examples 1-18, and optionally, wherein the NGV preamble comprises an NGV STF (NGV-STF) after the NGV-SIG field.

Example 20 includes the subject matter of Example 19, and optionally, wherein the NGV preamble comprises an NGV LTF (NGV-LTF) after the NGV-STF field.

Example 21 includes the subject matter of any one of Examples 1-20, and optionally, wherein the NGV PPDU comprises a data field after the NGV-SIG field.

Example 22 includes the subject matter of Example 21, and optionally, wherein the L-STF, L-LTF, and L-SIG field are configured for decoding by non-NGV STAs, and the NGV-SIG field is configured for decoding by NGV STAs.

Example 23 includes the subject matter of any one of Examples 1-22, and optionally, wherein the NGV channel comprises a 10 Megahertz (MHz) channel.

Example 24 includes the subject matter of any one of Examples 1-22, and optionally, wherein the NGV channel comprises a 20 Megahertz (MHz) channel.

Example 25 includes the subject matter of any one of Examples 1-22, and optionally, wherein the NGV channel comprises two 10 Megahertz (MHz) channels.

Example 26 includes the subject matter of any one of Examples 1-22, and optionally, wherein the NGV channel comprises two duplicate 10 Megahertz (MHz) channels.

Example 27 includes the subject matter of any one of Examples 1-26, and optionally, wherein the NGV PPDU comprises a broadcast NGV PPDU.

Example 28 includes the subject matter of any one of Examples 1-27, and optionally, wherein the NGV PPDU comprises a single-stream PPDU.

Example 29 includes the subject matter of any one of Examples 1-27, and optionally, wherein the NGV PPDU comprises a multi-stream PPDU.

Example 30 includes the subject matter of any one of Examples 1-29, and optionally, wherein the NGV wireless communication frequency band comprises a Dedicated Short Range Communications (DSRC) band.

Example 31 includes the subject matter of any one of Examples 1-30, and optionally, wherein the NGV wireless communication frequency band comprises a 5.9 Gigahertz (GHz) wireless communication frequency band.

Example 32 includes the subject matter of any one of Examples 1-31, and optionally, wherein the NGV wireless communication frequency band comprises a band between 5.85 Gigahertz (GHz) and 5.925 GHz.

Example 33 includes the subject matter of any one of Examples 1-32, and optionally, wherein the NGV PPDU is configured for a Vehicle to Everything (V2X) communication.

Example 34 includes the subject matter of any one of Examples 1-33, and optionally, comprising a radio to transmit the NGV PPDU.

Example 35 includes the subject matter of Example 34, and optionally, comprising one or more antennas connected to the radio, and another processor to execute instructions of an operating system.

Example 36 comprises an apparatus comprising means for executing any of the described operations of Examples 1-35.

Example 37 comprises a machine-readable medium that stores instructions for execution by a processor to perform any of the described operations of Examples 1-35.

Example 38 comprises an apparatus comprising: a memory interface; and processing circuitry configured to: perform any of the described operations of Examples 1-35.

Example 39 comprises a method to perform any of the described operations of Examples 1-35.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to cause a wireless communication station (STA) to:
generate a Physical layer (PHY) Protocol Data Unit (PPDU) preamble, the PPDU preamble comprising a non-High-Throughput (non-HT) Short Training Field (L-STF), a non-HT Long Training Field (L-LTF) after the L-STF, a first signal (SIG) field after the L-LTF, a second SIG field after the first SIG field, and a third SIG field after the second SIG field, wherein the first SIG field comprises a non-HT Signal (L-SIG) field, wherein the second SIG field comprises a Repeated L-SIG (RL-SIG) field, wherein the third SIG field comprises a version identifier field configured to identify a PPDU version of a PPDU comprising the PPDU preamble, wherein the third SIG field comprises Cyclic Redundancy Check (CRC) information based on the third SIG field; and
transmit the PPDU comprising the PPDU preamble over a wireless communication channel; and
a memory to store information processed by the processor.

2. The apparatus of claim 1, wherein the third SIG field comprises version-independent fields, which are version independent, wherein the version-independent fields comprise the version identifier field.

3. The apparatus of claim 2, wherein the third SIG field comprises version-dependent fields configured according to the PPDU version of the PPDU.

4. The apparatus of claim 3, wherein the version identifier field is before the version-dependent fields.

5. The apparatus of claim 3, wherein the version-independent fields are in a first symbol of the third SIG field, and the version-dependent fields are in a second symbol of the third SIG field.

6. The apparatus of claim 1, wherein the third SIG field comprises non-version-specific fields having a configuration, which is non-specific to the PPDU version of the PPDU.

7. The apparatus of claim 6, wherein the non-version-specific fields comprise the version identifier field.

8. The apparatus of claim 6, wherein the third SIG field comprises version-based fields configured according to the PPDU version of the PPDU.

9. The apparatus of claim 8, wherein the version identifier field is before the version-based fields.

10. The apparatus of claim 8, wherein the non-version-specific fields are in a first symbol of the third SIG field, and the version-based fields are in a second symbol of the third SIG field.

11. The apparatus of claim 1, wherein the third SIG field comprises a unified signal (U-SIG) field, wherein the U-SIG field comprises the version identifier field.

12. The apparatus of claim 1, wherein the third SIG field is immediately after the RL-SIG field.

13. The apparatus of claim 1, wherein the PPDU preamble comprises a fourth SIG field after the third SIG field, the fourth SIG field configured according to the PPDU version of the PPDU.

14. The apparatus of claim 1, wherein the CRC information is based on a first symbol and a second symbol of the third SIG field.

15. The apparatus of claim 1, wherein the third SIG field comprises Modulation and Coding Scheme (MCS) information corresponding to the PPDU.

16. The apparatus of claim 1, wherein the PPDU preamble comprises a Short Training Field (STF) after the third SIG field, the STF configured according to the PPDU version of the PPDU.

17. The apparatus of claim 16, wherein the preamble comprises a Long Training Field (LTF) after the STF, the LTF configured according to the PPDU version of the PPDU.

18. The apparatus of claim 1, wherein the PPDU comprises a data field after the third SIG field.

19. The apparatus of claim 1, wherein the wireless communication channel comprises a channel in a 2.4 Gigahertz (GHz) frequency band, a channel in a 5 GHz frequency band, or a channel in a 6 GHz frequency band.

20. The apparatus of claim 1 comprising a radio to transmit the PPDU.

21. The apparatus of claim 20 comprising one or more antennas connected to the radio, and another processor to execute instructions of an operating system.

22. A product comprising one or more tangible computer-readable non-transitory storage media comprising computer-executable instructions operable to, when executed by at least one processor, enable the at least one processor to cause a wireless communication station (STA) to:
generate a Physical layer (PHY) Protocol Data Unit (PPDU) preamble, the PPDU preamble comprising a non-High-Throughput (non-HT) Short Training Field (L-STF), a non-HT Long Training Field (L-LTF) after the L-STF, a first signal (SIG) field after the L-LTF, a second SIG field after the first SIG field, and a third SIG field after the second SIG field, wherein the first SIG field comprises a non-HT Signal (L-SIG) field, wherein the second SIG field comprises a Repeated L-SIG (RL-SIG) field, wherein the third SIG field comprises a unified signal (U-SIG) field, wherein the U-SIG field comprises a version identifier field configured to identify a PPDU version of a PPDU comprising the PPDU preamble; and
transmit the PPDU comprising the PPDU preamble over a wireless communication channel.

23. The product of claim 22, wherein the third SIG field comprises version-independent fields, which are version independent, wherein the version-independent fields comprise the version identifier field.

24. An apparatus comprising:
means for causing a wireless communication station (STA) to generate a Physical layer (PHY) Protocol Data Unit (PPDU) preamble, the PPDU preamble comprising a non-High-Throughput (non-HT) Short Training Field (L-STF), a non-HT Long Training Field (L-LTF) after the L-STF, a first signal (SIG) field after the L-LTF, a second SIG field after the first SIG field, a third SIG field after the second SIG field, and a Short Training Field (STF) after the third SIG field, wherein the first SIG field comprises a non-HT Signal (L-SIG) field, wherein the second SIG field comprises a Repeated L-SIG (RL-SIG) field, wherein the third SIG field comprises a version identifier field configured to identify a PPDU version of a PPDU comprising the PPDU preamble, wherein the STF is configured according to the PPDU version of the PPDU; and
means for causing the STA to transmit the PPDU comprising the PPDU preamble over a wireless communication channel.

25. The apparatus of claim 24, wherein the third SIG field comprises non-version-specific fields having a configuration, which is non-specific to the PPDU version of the PPDU.

* * * * *